(12) United States Patent
Soar

(10) Patent No.: US 9,240,702 B2
(45) Date of Patent: *Jan. 19, 2016

(54) MODULAR POCKET WITH INDUCTIVE POWER AND DATA

(75) Inventor: Roger J. Soar, Kelowna (CA)

(73) Assignee: CYNECTIC DESIGNS LTD. (CA)

( * ) Notice: Subject to any disclaimer, the term of this patent is extended or adjusted under 35 U.S.C. 154(b) by 514 days.

This patent is subject to a terminal disclaimer.

(21) Appl. No.: 13/557,517

(22) Filed: Jul. 25, 2012

(65) Prior Publication Data

US 2014/0111147 A1 Apr. 24, 2014

Related U.S. Application Data

(63) Continuation-in-part of application No. PCT/CA2011/000128, filed on Jan. 27, 2011, and a continuation-in-part of application No. 12/926,858, filed on Dec. 14, 2010, now Pat. No. 7,994,752, which is a continuation of application No. 11/922,788, filed on Dec. 21, 2007, now Pat. No. 7,863,859.

(60) Provisional application No. 61/282,350, filed on Jan. 27, 2010.

(51) Int. Cl.
| | |
|---|---|
| H02J 7/00 | (2006.01) |
| H02J 7/02 | (2006.01) |
| H01F 27/36 | (2006.01) |
| H01F 38/14 | (2006.01) |

(52) U.S. Cl.
CPC .............. *H02J 7/025* (2013.01); *H01F 27/365* (2013.01); *H01F 38/14* (2013.01)

(58) Field of Classification Search
CPC ..... H02J 7/0045; H02J 7/0042; H02J 7/0044; H02J 7/025

USPC ........................................... 320/108, 113–115
See application file for complete search history.

(56) References Cited

U.S. PATENT DOCUMENTS

| | | | |
|---|---|---|---|
| 5,264,776 A | 11/1993 | Hulsey | |
| 5,455,466 A | 10/1995 | Parks et al. | |
| 5,550,452 A | 8/1996 | Shirai et al. | |
| 5,959,433 A | 9/1999 | Rohde | |

(Continued)

FOREIGN PATENT DOCUMENTS

| | | |
|---|---|---|
| EP | 1610439 | 12/2005 |
| WO | 00/16493 | 4/2000 |

OTHER PUBLICATIONS

Standard ECMA-340, Near Field Communication Interface and Protocol -1 (NFCIP-1), 2nd Edition, Dec. 2004.

(Continued)

*Primary Examiner* — Nghia Doan
(74) *Attorney, Agent, or Firm* — Anthony C. Edwards

(57) ABSTRACT

A modular pocket system includes a modularly mountable pocket modularly mountable to a tactical garment. An insert is mounted in the pocket to align and closely inductively couple a primary inductive coil and related primary drive circuits in the insert to a secondary inductive coil and related secondary charging circuits in a portable electronic device mountable into the insert for the inductively coupled transmission of power between the coils so to transmit power to the portable device, where the device has a rechargeable energy storage component electrically connected to the secondary inductive coil and secondary charging circuits.

24 Claims, 22 Drawing Sheets

(56) References Cited

U.S. PATENT DOCUMENTS

| | | | |
|---|---|---|---|
| 6,301,128 B1 | 10/2001 | Jang et al. | |
| 6,356,052 B2 | 3/2002 | Koike | |
| 6,388,422 B1 | 5/2002 | Lew | |
| 6,424,820 B1 | 7/2002 | Burdick et al. | |
| 6,476,581 B2 | 11/2002 | Lew | |
| 6,490,176 B2 | 12/2002 | Holzer et al. | |
| 6,657,351 B2 | 12/2003 | Chen et al. | |
| 6,906,495 B2 | 6/2005 | Cheng et al. | |
| 6,924,619 B2 | 8/2005 | Dvorak | |
| 7,076,206 B2 | 7/2006 | Elferich | |
| 7,149,552 B2 | 12/2006 | Liar | |
| 7,254,366 B2 | 8/2007 | Palermo | |
| 7,352,567 B2 * | 4/2008 | Hotelling | G06F 1/1632 312/223.2 |
| 7,408,324 B2 | 8/2008 | Baarman | |
| 7,462,951 B1 | 12/2008 | Baarman | |
| 7,612,528 B2 | 11/2009 | Baarman et al. | |
| 7,657,255 B2 | 2/2010 | Abel et al. | |
| 7,681,788 B2 | 3/2010 | Van de Velde et al. | |
| 7,728,551 B2 | 6/2010 | Reed et al. | |
| 7,797,248 B1 | 9/2010 | Bierbaum et al. | |
| 8,633,616 B2 * | 1/2014 | Soar | 307/104 |
| 2002/0154518 A1 | 10/2002 | Elferich et al. | |
| 2004/0145342 A1 | 7/2004 | Lyon | |
| 2004/0189246 A1 | 9/2004 | Bulai et al. | |
| 2004/0232845 A1 | 11/2004 | Baarman et al. | |
| 2005/0017958 A1 | 1/2005 | Silverbrook et al. | |
| 2005/0127866 A1 | 6/2005 | Hamilton et al. | |
| 2006/0224048 A1 | 10/2006 | Devaul | |
| 2008/0079388 A1 | 4/2008 | Sarnowsky et al. | |
| 2009/0106567 A1 * | 4/2009 | Baarman | G06F 1/1628 713/300 |
| 2009/0218884 A1 | 9/2009 | Soar | |
| 2010/0090491 A1 | 4/2010 | Hipshier et al. | |
| 2010/0201201 A1 | 8/2010 | Mobarhan et al. | |

OTHER PUBLICATIONS

Standard ECMA-352, Near Field Communication Interface and Protocol-2 (NFCIP-2), 2nd Edition, Jun. 2010.

Standard ECMA-386 Cryptographic Standard Cryptography Standard using ECDH and AES (NFC-SEC-01) 2nd Edition, Jun. 2010.

* cited by examiner

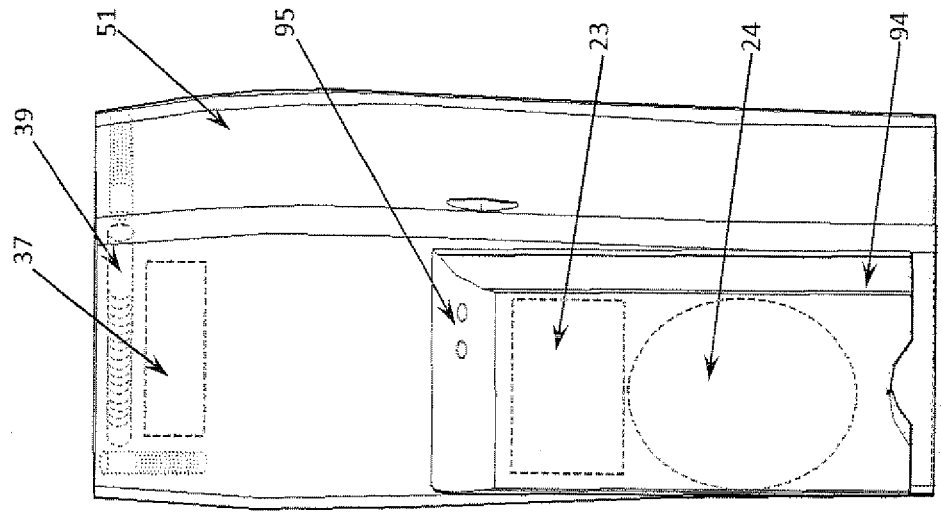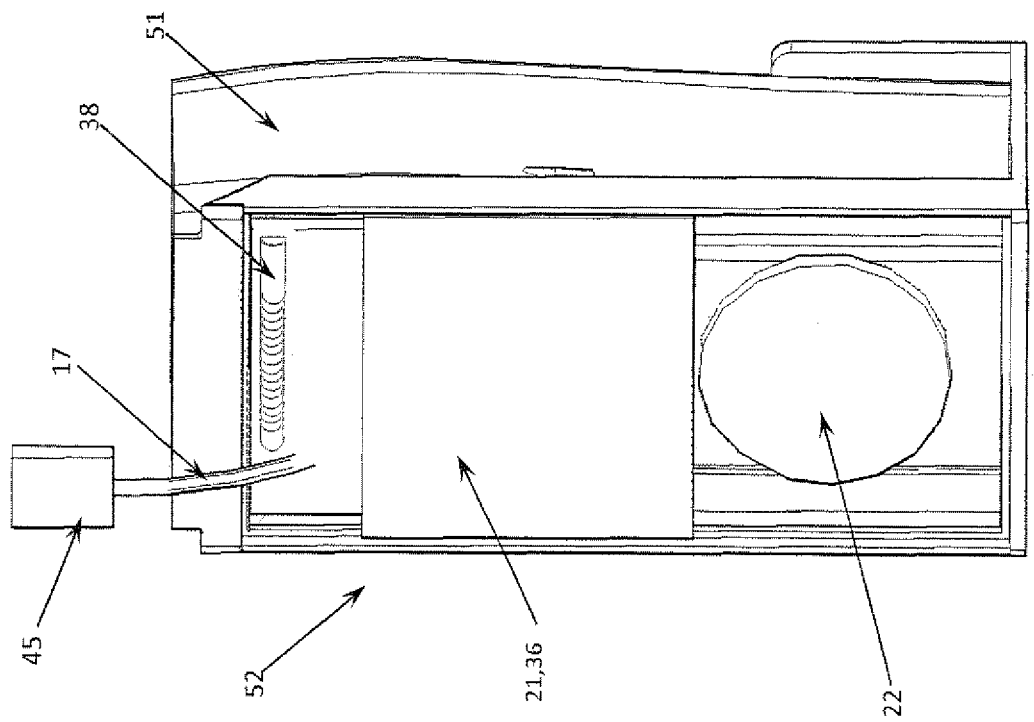

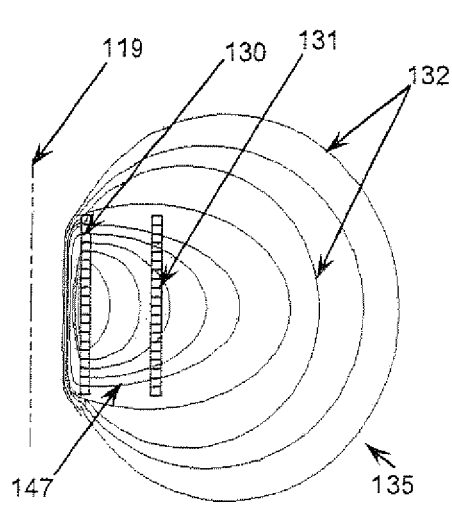
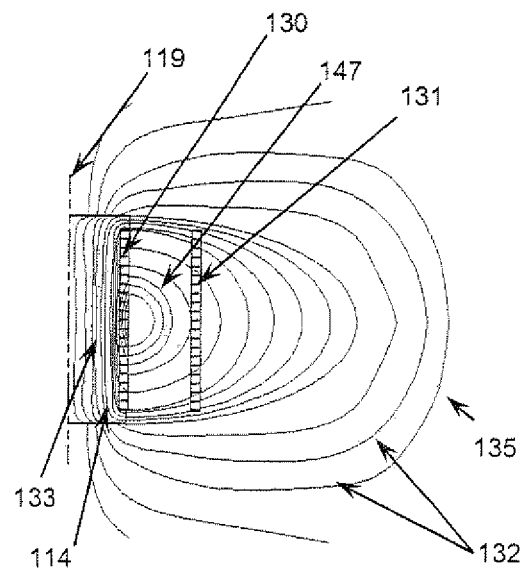
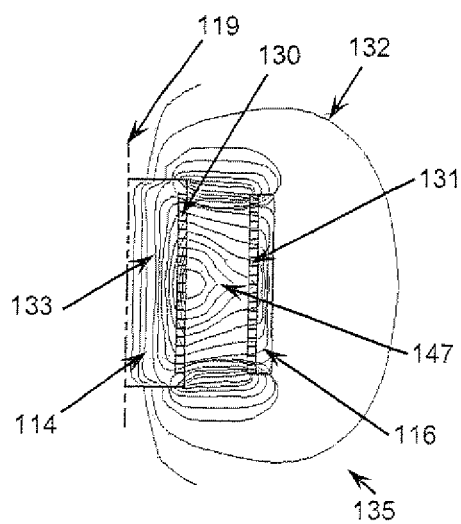
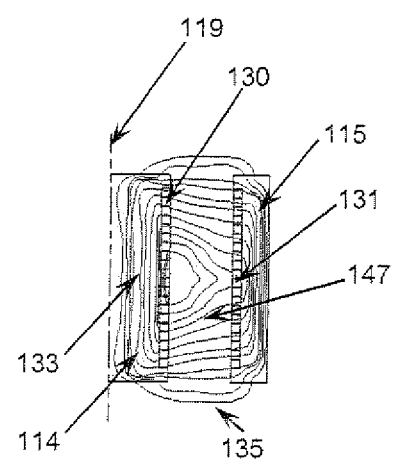
FIGURE 10

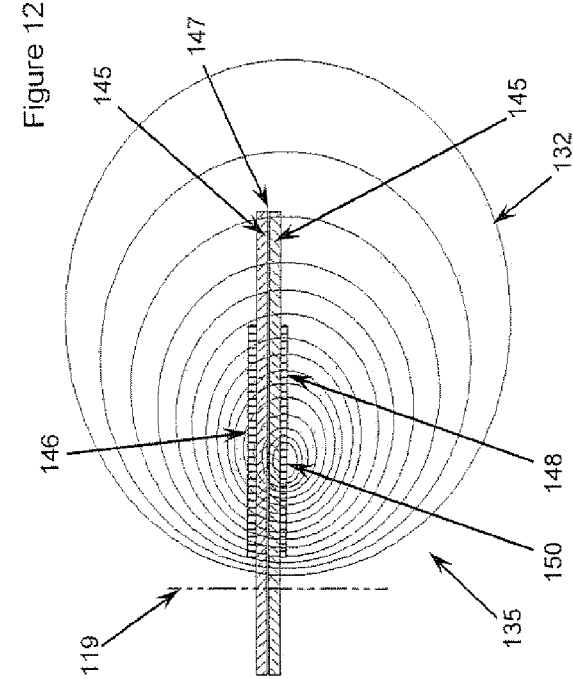
Figure 12A
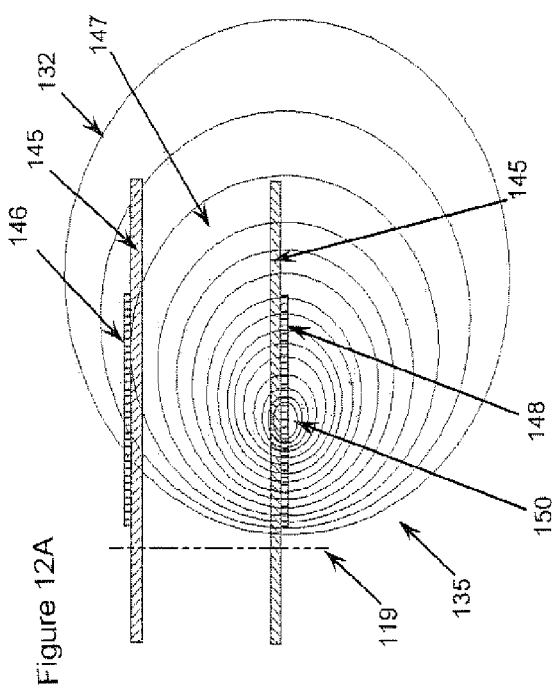
Figure 12B
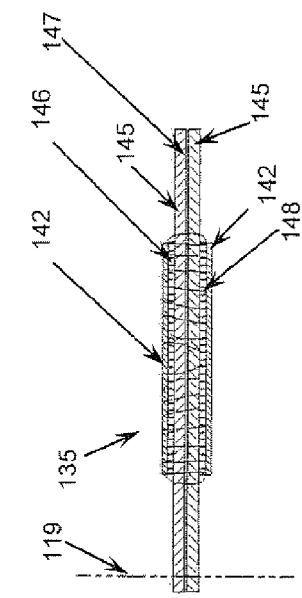
Figure 12C
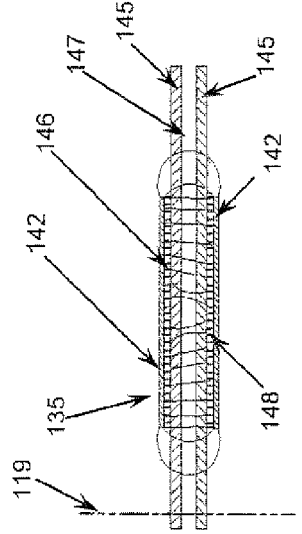
Figure 12D
FIGURE 12

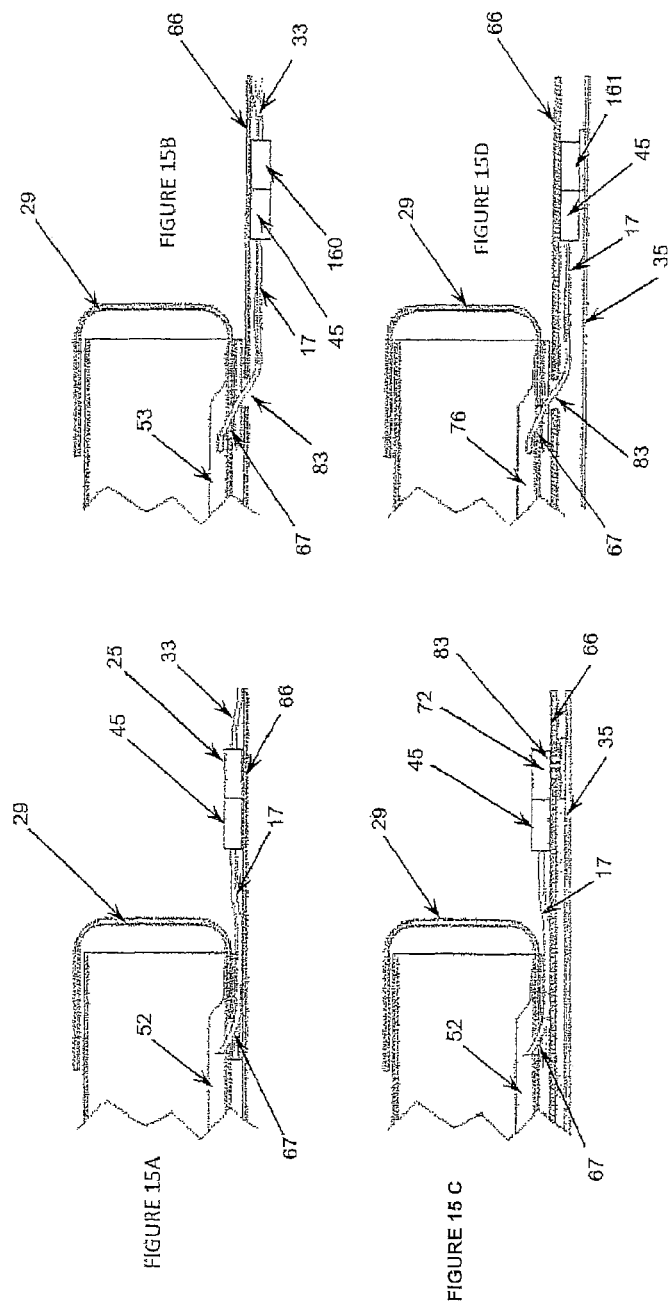

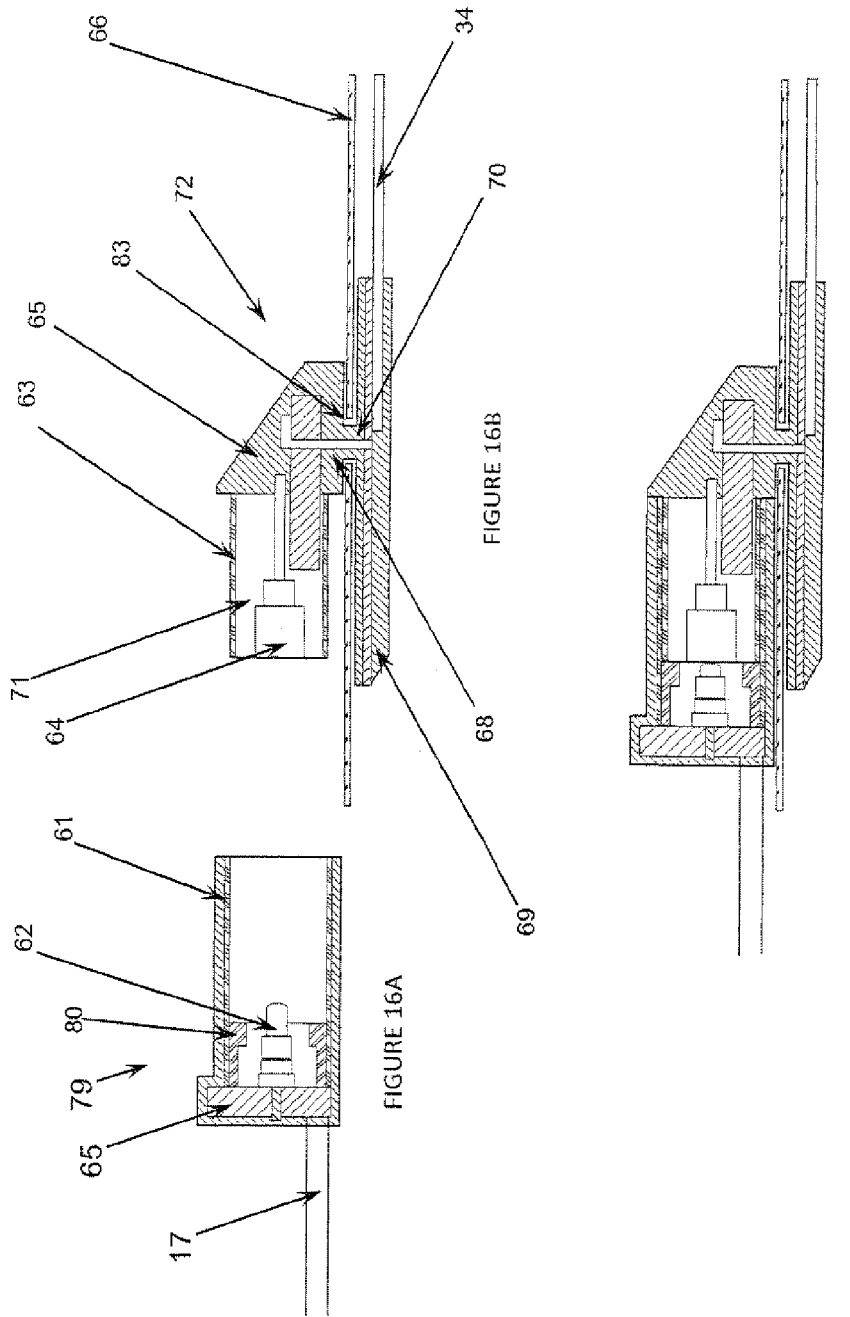

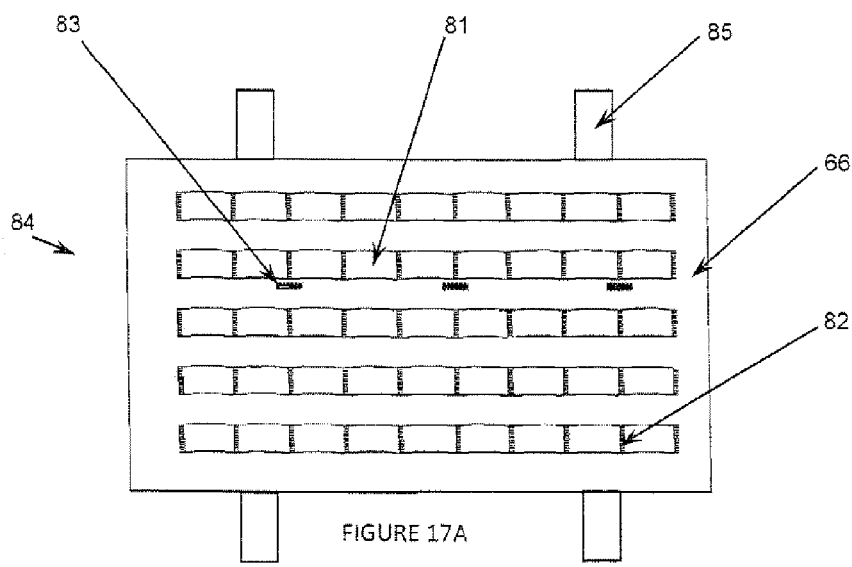
FIGURE 17A
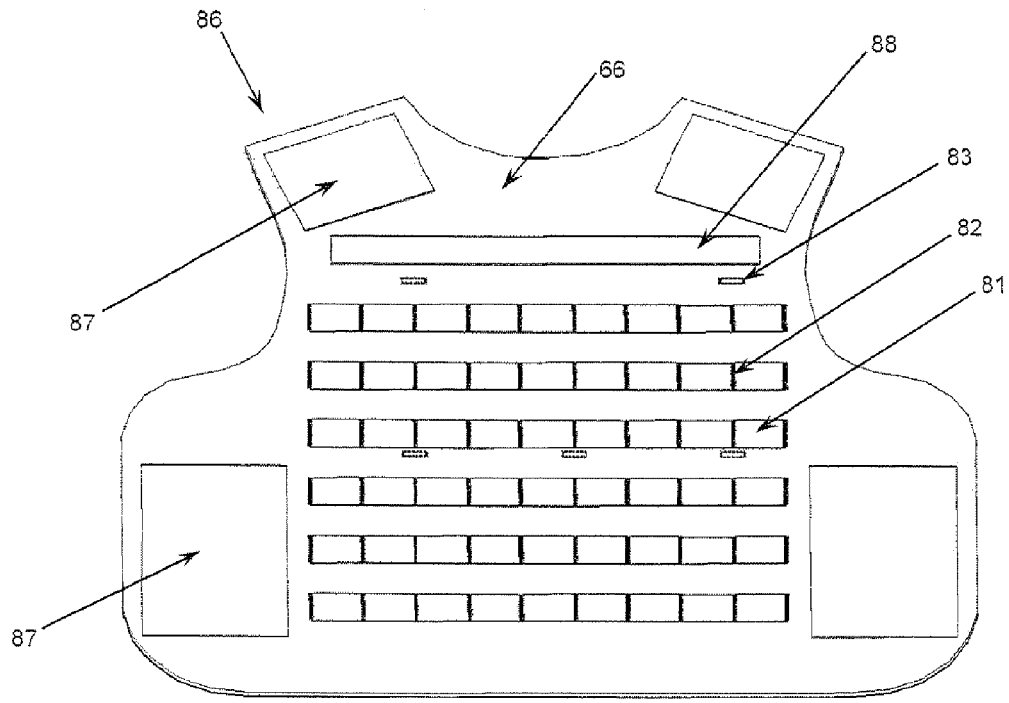
FIGURE 17B
FIGURE 17

MODULAR POCKET WITH INDUCTIVE POWER AND DATA

CROSS REFERENCE TO RELATED APPLICATIONS

This application is a continuation-in-part of PCT application No. PCT/CA2011/000128 filed Jan. 27, 2011, which claimed priority from U.S. Provisional Patent Application Ser. No. 61/282,350 filed Jan. 27, 2010, and which was a continuation-in-part of U.S. patent application Ser. No. 12/926,858 filed Dec. 14, 2010, which is a continuation of U.S. patent application Ser. No. 11/922,788 filed Dec. 21, 2007, now U.S. Pat. No. 7,863,859.

FIELD OF THE INVENTION

This invention relates to the field of devices which are inductively coupled to a charger for the charging of their batteries, fuel cells or other energy storage devices, and in particular to a modular pocket system and its pocket insert which provides for the inductively coupled transmission of power for the charging of a device held in the pocket.

BACKGROUND OF THE INVENTION

Soldiers have always carried a significant load when on patrol or in battle. In the recent past the load was carried in large marching packs, smaller day packs and their immediate fighting order on a load carriage or tactical vest. This vest contained all the immediate ammunition, grenades, flashlight, water, first aid and other essential smaller equipment that a soldier is required to have immediately at hand. More recently the modern soldier must also now carry a multitude of electronic equipment such as inter and intra-squad radios, GPS, flashlight, electronic displays, keypads and computer interface devices.

With the advent of the future soldier, this electronic burden has become an even greater contributor of the overall fighting order load and has created a considerable logistic burden with respect to the battery management of all the electronic devices the soldier is carrying. The battery burden can easily be 3-6 different battery types that in conjunction with spares, weigh as much as 4 kg for a 24 hour mission. A significant logistic issue is not only the physical weight of the batteries, but the fact that soldiers are prone to replacing their electronic device batteries whenever they think the ones installed are not sufficiently fresh. As the devices rarely have a battery energy gauge, studies have found soldiers typically throw away up to 70% of the energy they have been carrying. This is extremely expensive power that is thrown away from both the perspective of the soldier who carried it and never used it and the logistic replenishment support cost. In addition soldiers do not know what batteries to take on a mission as different devices use their own type of battery and the use of equipment will change with the tactical scenario. Frequently a soldier may not be re-supplied within the expected time frame.

An option in future soldier vest designs is the use of a central power system using one or more higher capacity central batteries, that power an integrated power and data harness. Power is distributed to various nodes on the garment to supply the electronic devices carried by the soldier with recharge power and power data via quick-connect connectors. Power data transfer is required to provide a Central Power Management (CPM) capability. The various devices are interrogated by the CPM as to their state of charge and are charged according to priority and amount of central power remaining. As central power is lost, the CPM can start removing lower priority devices from the power, saving the power for the high priority devices. The same cable connector system used for power will also provide the ability for communication data exchange. Communication data would include text, voice, still images and video etc.

The use of cables providing power and data connections to a soldiers electronic equipment is a considerable problem as the cables snag, connectors break and both are subject to damage by the environment. It is also very difficult to connect equipment with gloved hands in an expeditious fashion when the equipment is then to be stowed in pockets, during for example an intense tactical situation such as a fire fight.

In addition to the stated device power and data transmission issues, the soldiers in a unit are assigned different roles, are provided with different electronic devices, each of which may be required to be used at different intervals and require being placed in different locations or configurations on the load carriage vest or tactical garment. The reconfiguration problem is compounded by the fact that all the electronic and non electronic devices and equipment require their own specialized pockets as the size and shapes of objects carried is unique to that device. Further each soldier may have different personal preferences or may be assigned a new role which require his equipment to be reconfigured. For example the position of various devices on a vest will change depending on if the soldier shoots from the left or right shoulder. Many existing soldier systems cannot accommodate soldiers that shoot using the left shoulder because the pockets cannot be reconfigured. To meet the challenge of fighting order and load carriage equipment reconfiguration, most militaries have designed and now use load bearing equipment such as a load carriage vest, tactical vest, tactical pants and other garments that allow the pockets to be moved around on the soldier or reconfigured to a very considerable extent.

I am aware of the following prior art and references:

| US Patent Documents | | |
|---|---|---|
| 7,254,366 B2 | August 2007 | Palermo |
| 7,408,324 B2 | August 2008 | Baarman |
| 7,149,552 B2 | December 2006 | Lair |
| 7,076,206 B2 | July 2006 | Elferich |
| 6,924,619 B2 | August 2005 | Dvorak |
| 2006/0224048 A1 | October 2006 | Devaul |

REFERENCES

Standard ECMA-340, Near Field Communication Interface and Protocol-1 (NFCIP-1), $2^{nd}$ Edition December 2004

Standard ECMA-352, Near Field Communication Interface and Protocol-2 (NFCIP-2), $2^{nd}$ Edition June 2010

Standard ECMA-386 Cryptographic Standard Cryptography Standard using ECDH and AES (NFC-SEC-01) $2^{nd}$ Edition, June 2010

Baarman (US Patent 2008/7,408,324 B2) "Implement Rack and System for Energizing Implements" describes the application of inductive energy to charge various garden tools principally via a wall mounted rack. He also describes the use of a garment with inductive charging capability to fixed pockets. The garment is provided with source power from a fixed energized pole.

Elferich (US Patent 2006/7,076,206 B2) "System for Wireless Transmission of Electrical Power, a Garment, a System of Garments and Method for the Transmission of Signals and/or Electrical Energy" describes the application of large diameter air backed inductive coils on the arm and torso of a garment to transfer power between garments and from a pocket to a device. Neither Baarman or Elferich teach about pockets that are removable or re-locatable on a garment while maintaining an efficient level of power transfer due to accurate co-location of inductive elements in the pocket and the devices to be charged.

I hereby incorporate by reference the following of my US patents and Applications: U.S. Pat. No. 7,863,859 entitled "Contactless Battery Charging Apparel", U.S. patent application Ser. No. 12/923,895 entitled "Soldier System Wireless Power and Data Transmission".

SUMMARY OF THE INVENTION

One embodiment of my invention allows for the contactless inductive transfer of power, power management data and communication data between a tactical garment and either a modular or re-locatable pocket that connects to the wiring harness or integrated conductive textile backplane via a pigtail connection or low profile connectors. The connectors between the pocket and solider system may be located above or under the garment external fabric layer and be co-located in multiple positions on the garment with pocket attachment points or be clustered in a single point. Within the pocket, the external power is provided to the primary circuit of an inductive charging system, with the secondary circuit residing in the electrical/electronic device to be stowed in the pocket and that has batteries requiring charging. The primary charging circuit also allows inductive communication with the secondary charging circuit to determine the state of charge of the device's battery, this information is fed back to the primary circuit which is then accessible by the central power management system.

My invention can be implemented at different functional levels. The most basic implementation is a garment design that does not require a central power management system or the need for the exchange of power management data. In this case the modular pockets primary circuit for each device works autonomously, drawing power to charge its respective device on a demand basis until the central power source, such as a larger capacity battery or fuel cell is depleted at which time it is replaced with a fresh supply. The second level of implementation is the inductive transfer of both power and power management data that would enable monitoring and control of charging by a central power management system to which all the devices to be charged would be connected via the garments integrated power and data harness. At this level of implementation the charging priority of a device can be controlled by the CPM depending on the type of tactical situation (e.g. night or daytime) the soldier may be in. The third level of implementation is inductive power, power management data and communications data. The wireless inductive communications data link would allow the devices to now exchange text, voice, still image and video communications between the device and the modular pocket. Conceivably, there may be a requirement for inductive power and communication data without the implementation of power management.

What follows is a case example of how the system would work. A soldier first of all decides where on his tactical vest he would like to mount his GPS and its pocket. The pocket is attached to the vest and connected to the power harness or bus. If he requires to use his GPS for example in an intense tactical situation, be accesses the pocket and removes the GPS without any associated disconnection of power and data cables. He uses the GPS and then simply replaces it back into his pocket without having to reconnect any power or data cables. Once the GPS is placed back into the pocket the primary circuit's proximity detection identifies the GPS, performs a handshake protocol to ensure it is a rechargeable device, the primary circuit then interrogates the device inductively to determine its state of charge. The central power management computer interrogates the primary circuit over an SMBus and determines whether or not the GPS should be recharged. If allowed by the CPM, the GPS is recharged by the modular pockets primary circuit wirelessly and back up to full capacity. Concurrently, the GPS is finishing the inductive transmission of tagged still images the soldier took with the GPS camera and that started transmitting while he was holding the device. Once the data is received by the primary inductive transmit/receive circuit within the pocket insert, the data is transmitted conductively to the soldiers central computer where it can then be sent over his tactical radio to command without him ever having to connect a cable.

BRIEF DESCRIPTION OF THE DRAWINGS

FIGS. 4A and 4B are Diagrams of the rear of the pocket insert with rear cover removed to show example locations of the interior electronic components for inductive power and data transfer.

FIG. 10. Illustrations of the magnetic field when an AC current is applied to the inner coil of the coil assemblies shown in FIG. 9. The AC energy required to induce the magnetic flux can be applied to either the inner or outer coils to obtain inductive power transfer between coils.

FIG. 12. Illustrations of the magnetic field when an AC current is applied to the planar coil assemblies shown in FIG. 11. The AC energy required to induce the magnetic flux can be applied to either the upper or lower coils to obtain inductive power transfer between coils.

FIG. 15. Example connector configurations between the modular pocket insert and the soldier system.

FIG. 16. Cross section diagram of a fabric transition or pedestal connector showing male and female components.

FIG. 17. A representative exterior fabric garment panel with a PALS ladder webbing system for pocket attachment.

DETAILED DESCRIPTION OF EMBODIMENTS OF THE INVENTION

General Features

Figure 1:
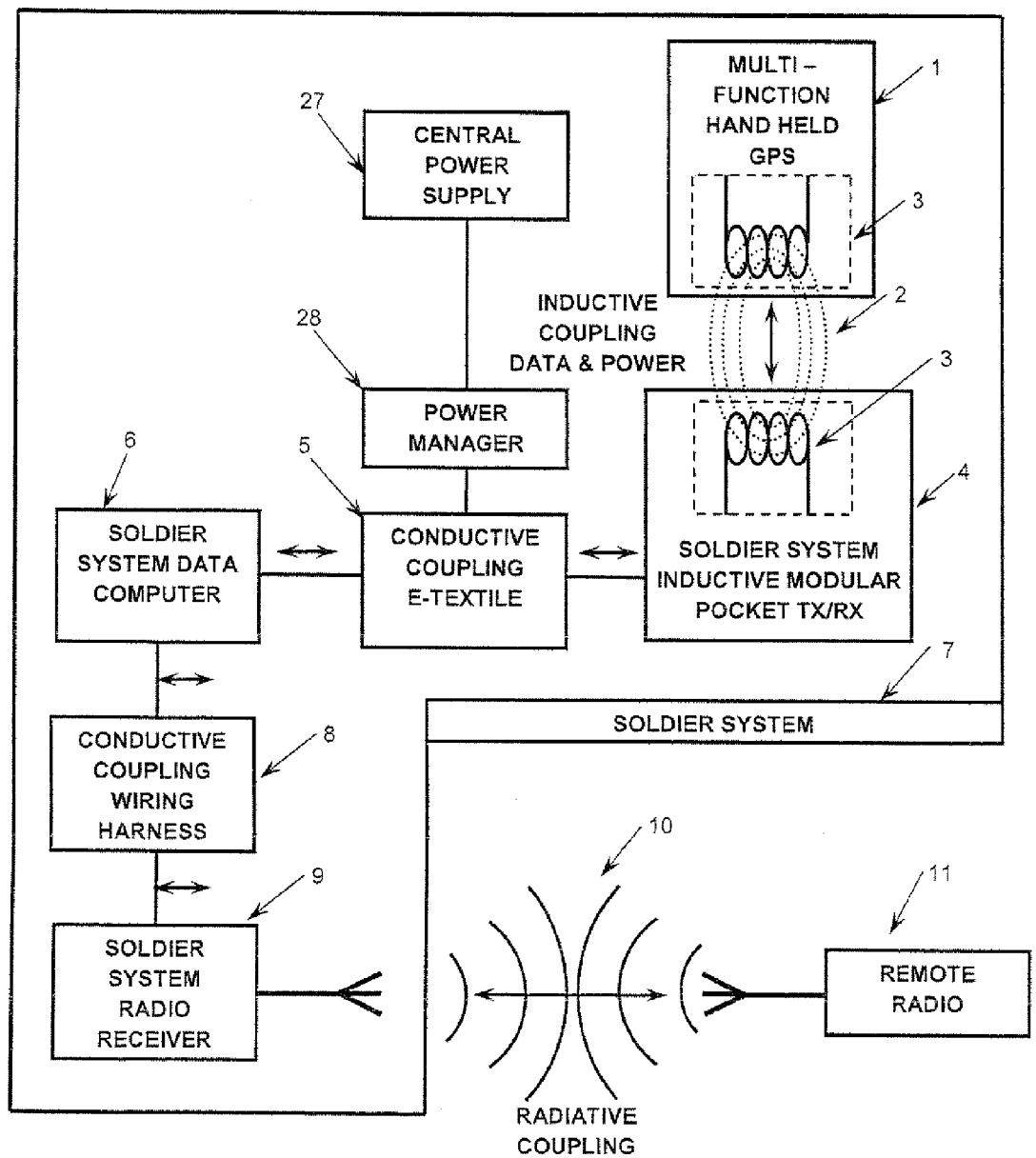
FIG. 1. Block diagram of the main modes of electromagnetic coupling: inductive, conductive and radiative, used in a soldier system with modular pockets providing inductive power transfer and inductive data transfer FIG. 2. Simplified connection schematic for the inductive modular pocket and associated central power supply and power management system FIG. 3. Diagram showing a front view of a molded-surface modular pocket rigid insert having one example of a mechanical aligner to hold a pocket-stored portable electronic device in its correct precise alignment and proximity for efficient inductive coupling for power and power data transfer.

A modular pocket that allows transfer of wireless electrical power, CPM data and communication data using inductive coupling between a modular pocket and an electrical/electronic device placed within it. The modular pocket is able to be moved to different locations on the base garment and be easily and quickly reconnected with plug and play connectivity. The pocket receives and transmits its power and CPM and communications data by connecting to a conductive power and data harness integrated into the garment using conventional electro-mechanical wire, Mylar or other flexible cabling and connectors or may utilise new designs to facilitate connection to electro textiles or other power and data conductive materials.

The benefits of contactless inductive charging are many. The secondary charging circuit determines the charging voltage independent of the voltage provided to the primary side. With appropriate selection of electronic components a central supply voltage of 12-30 VDC to the primary drive circuit that is inductively connected to the secondary side charging circuit can provide any voltage in the range of for example 1.5 to 30 VDC, to device batteries with power levels of less than 1 watt to 5 watts or greater. The mechanical and environmental ruggedness of a device can now be substantially increased. With no exposed connectors or electrical contacts required for charging, the device can be semi-permanently sealed as primary battery replacement or access is not required with the use of integrated rechargeable energy storage, thus inherently increasing a devices' long term integrity. These design features are further enhanced by the fact that both inductive power and data can be transferred between the pocket and device when they are fully submerged in water, or exposed to ice, snow, mud, dust, dirt, sand etc. as well as battlefield petroleum, oils and lubricants (POL's).

Inductive power transfer from a pocket to a device can provide charging power to any type of energy storage medium or component located on or within the device. The energy storage component of a device may be a battery or chemical energy storage of any chemistry type, or capacitive energy storage such as a super capacitor of any chemistry type. Regardless of the physical or chemical structure of the rechargeable energy storage of an electronic device, it may be of several configurations as a part of the electronic device. For example with respect to rechargeable battery power sources, if the device has an internal battery compartment with a simply opened cover the battery may be easily replaceable; the device may have a small external battery that attaches with latches and integrates onto the exterior of the device; it may be a large external battery that attached to the base of the device; or an internal battery however one that is still removable such as those found on a cellular phone or GPS; or be a highly integrated internal battery that requires special tools to replace.

An overall weight saving is obtained when using a central battery and inductive charging of secondary device batteries versus having to carry replacement primary batteries. For example, if we compare to 2300 maH Alkaline AA's as the existing primary power source installed in the distributed electronic devices, then we can assume they will have an operational efficiency of 30%. We can also that a 80wHr Li ion central battery can be drawn down to 0% capacity using a central power manager. With an inductive charging system that has a 70% DC volt in to Li charger DC volt out power transfer efficiency, and including a parasitic weight of 50 grams per inductive charging node (assuming five nodes per soldier system) then, for the first kilogram of AA batteries carried by a soldier a weight savings of 400 grams would be realised. For the second kilogram of AA batteries with the parasitic weight of the inductive nodes already accounted for, a 600 gram weight savings would be realized.

The efficient transfer of inductive power is critical to its successful implementation as without a high magnetic coupling between the coils there will not be efficient transfer of power. The pocket insert provides the required mechanical support and alignment required to obtain continuous precise alignment during the extended periods of time the device is being charged while it is being carried in the pocket and during which time the soldier could be engaged in vigorous activities that place the pocket in multiple orientations.

Power management capability for each device can be inherently provided by using an SMBus protocol connection of the pockets to a soldier system power management module.

Benefits of Contactless Transfer of Inductive Communications Data

For a soldier system, magnetic flux inductive communication data transmission offers the advantage that it can perform short range data exchange without a wired or physical connection. Inductive coupling has excellent material penetration capabilities. It can penetrate non-magnetic materials such as air, water, body tissue, fabric, soft armour panels, and plastic. As no exposed electrical contacts are required for inductive data transfer or inductive power charging, the primary side of the inductive circuits located in the modular pocket can be fully encapsulated and environmentally ruggedized. As the secondary side device circuit is contained within the target independent device, the independent electronic device can now be semi-permanently sealed and ruggedized as frequent data cable coupling and battery replacement is not required. This enables the inductive power and data transfer enabled devices be full submersed in water, and be impervious to exposure to ice, snow, mud, dust, dirt, sand, etc as well as battlefield petroleum, oils and lubricants (POL's).

Modular Pocket Description

The modular pocket contains the powered primary side of the inductive system. The pocket receives DC voltage power from a central power source (energy storage device such as a battery, fuel cell or other source) and CPM and communications data via a conductive connection to a central power and data harness contained within the garment. The pocket can be disconnected from the garment harness when the pocket is moved to another location on the garment at which time it would be reconnected to a new connection node on the power and data harness.

One benefit of this invention is that the primary and secondary coils of the inductive charging system are held in close proximity and are precisely aligned with each other by a mechanical aligner allowing the inductive circuit to provide maximum power transfer efficiency. Without a high level of power transfer efficiency, the potential aforementioned centralized battery weight savings will not be realized.

The system can be designed to have plug and play capability. That means that the central power source, any pocket and even the central power manager can be plugged into the wiring harness at any location without any change in system configuration or performance. This allows the user to configure system to suit his own purposes.

The modular pocket can be designed to hold any military or civilian portable electronics that contain within them a rechargeable energy storage component and that can be modified to accept the inductive power and data circuits.

A modular pocket can be a power drain (i.e. provides charging to electronic or electrical devices) or a power source (i.e. a battery, super capacitor or fuel cell etc) and can be connected at multiple locations on the torso. When the pocket is used as a power source, it may either connect to the vest wiring harness with a direct electro-mechanical connection or it may also connected using inductive power transfer with the primary inductive circuit located on the battery and the secondary inductive power receiving circuit located in the pocket. When a pocket is used to hold a central power source, the power source may have an integrated fuel gauge and communicate with the CPM via a System Management Bus (SMBus) or I$^2$C Bus or CAN Bus protocols and interface requirements. A battery fuel gauge, for example can be an LED, LCD or other array that visually allows the user to determine his remaining central battery energy without accessing the CPM. A computer or power management device may be connected directly into the wiring harness. The SMBus or I$^2$C bus or equivalent allows the central power management system to know both the power level of the central power source and of the power level of each device contained within an inductively charged modular pocket.

A modular pocket may also be designed to recharge a standalone energy storage component such as a battery or super capacitor, that is from a device not worn on the users torso or garment but carried or worn elsewhere by the user, such as a weapons sub-system or helmet sub-system.

The inductive communication electronic circuit may be independent of the power transfer and power management data circuits or in some applications may all be fully integrated with the inductive power circuit. The primary inductive power and data circuits may be a discrete module encapsulated in epoxy or other substrate that provides both mechanical and environmental protection to the circuits and coils and that can be sewn into a lining or inner pouch within a modular pocket, or may be an integrated semi-rigid or rigid insert that provides both mechanical alignment and protection for the primary circuit and enhances its coupling efficiency with the secondary charging circuit.

The basic function of the primary inductive circuit is to take DC power and convert it into a high frequency alternating current so that the primary coil within the pocket and secondary coil within the device can inductively couple using AC magnetic flux, which allows the transfer of power between the pocket and the device without a wired connection. An inductive coil and capacitor which form a resonant tank circuit are connected to the primary drive circuit. A typical frequency for inductive power transfer is from 20 kHz to 500 khz and the RFID frequency of 13.56 MHz, although as would be known to one skilled in the art other AC frequencies could be used.

The primary and secondary inductive coils can be any shape or size to suit packaging formats determined by the pocket and the device. The coil can be planar, cylindrical or any other appropriate geometric shape and can be made out of many conducting materials, although typically a wire wound coil, or may be a single layer or multi-layer trace on a PCB, or be printed on Mylar etc. The coil may be an backed by air or may be backed or supported on a ferrite core to enhance its magnetic coupling efficiency as described further below.

Typically to conserve power and keep overall system efficiency as high as possible, the primary side of the inductive charging system is in a very low power, sleep mode when it is not activated to charge the secondary side. The primary circuit in the pocket can sense the proximity of a secondary device through such means as a proximity sensor, e.g. a hall effect sensor, at which time a handshake protocol is exchanged to determine the charge status of the energy storage component within the device and if charging should commence. Alternatively the primary circuit may inductively poll or ping on a regular basis to determine if a secondary device to be charged is in proximity. When the polling process determines a secondary circuit is in position, a handshake protocol is exchanged to determine the charge status of the battery and if charging should commence.

The inductive drive circuit sub-circuits typically include an oscillator, transistor switching drive circuit and microprocessor. The microprocessor interfaces with the primary drive circuit to allow inductive data to be transferred back and forth to the secondary circuit and thus allow wireless monitoring of the battery charging. The microprocessor in the primary circuit also allows communication with the CPM system via an interface such as the SMBus or I$^2$C Bus interface. The CPMS can selectively control the provision of power from the central power source depending on the tactical scenario that has been inputted into it, therefore a device may or may not receive power for charging depending on the devices priority status for charging and the current CPMS scenario.

The device placed into the modular pocket containing the primary charging circuit contains the secondary side of the inductive charging system. The secondary charging circuit incorporated into the device can inductively transmit the charge status of the energy storage component to the primary side. The secondary circuit may be co-located with the secondary charging coil and may be located within or attached as a separate fixture to the device that holds the battery to be charged. The secondary coil has the same construction options as would be known to one skilled in the art as the primary coil, and can be made in many configurations and out of many different materials. The secondary circuit provides rectification of the received inductive AC power signal, voltage regulation as required and power to an intelligent charging circuit that includes a means of providing inductive data feedback through the secondary coil to the primary coil and circuit. Rectification, the conversion of received AC power signal to a DC power signal can be by diode bridge, synchronous rectification techniques or other means.

Typically the energy storage component charging circuit would be that for a Li Ion or Lithium Polymer battery, but any present of future battery technology could be charged with the appropriate interface circuit. Other energy storage technologies such as super capacitors may also be used with an appropriate charging interface circuit. The energy storage component charging circuit would be connected to the energy storage component providing it with charge as determined by the CPM.

To enhance efficiency and optimise proximity between the primary and secondary circuit an insert can be provided within the modular pocket. The electronic device is slid into the pocket insert which can be formed from many rigid or semi-rigid materials such as plastics, semi-rigid foams or other materials that are non-conductive and non-magnetic. If required the design of the insert can provide pressure onto the side of the device opposite the primary/secondary coil interface, thus keeping the device in intimate contact with the insert and in turn keeping the primary and secondary coils in close physical proximity therefore maximizing power transfer efficiency. The insert provides the added advantage of providing mechanical protection to electronic devices placed in the pocket, especially if they are placed on the front of the garment where they may be subject to impact.

If the primary and secondary coils are cylindrical in geometry then the insert provides a base on which to mount the primary coil or coils and also serves to guide the device onto the primary coil providing exact alignment with the secondary coil. The primary coil can be on any surface of the pocket such as the back side against the body, front side away from the body, pocket side, top or bottom, as long as it is in intimate or close proximity to the secondary coil within the device to be placed within the pocket.

As previously discussed an inductive pocket insert would also be of benefit to a device placed into a fixed pocket. The pocket not only provides a protective housing for the primary inductive power and data circuits but also provides exact mechanical alignment of the primary coil in the insert with the secondary coil in the device ensuring optimal power transfer efficiencies. Without the insert the device can shift in the pocket relative to the primary coil and loose the efficiencies gained by high coupling between aligned coils.

The battery charge data transferred between the primary and secondary side of the inductive charging system can be serial data using any of many protocols typically used in inductive telemetry communication or RFID devices.

Ferrites to Enhance Power Transfer,

The mechanism of power transfer within this application is based upon primary and secondary coils that are inductively coupled across an air gap, which then makes them by definition an air core transformer. The primary and secondary coils may be air backed or to optimise the inductive coupling and the wireless power transfer efficiency between the coils, different shapes, thickness and composition of ferrite backing can be employed to direct or create a path for the magnet flux between the coils. Ferrite is a backing or housing for the primary and secondary coils if they are planar, when the coils are cylindrical the ferrite could be a core or bobbin on the inside coil, and a sheath or housing on the outside coil. The geometry of the coil determines the type and shape of ferrite that would be used. The composition of ferrite material used is determined by the resonant frequency of the coils. The ferrite can be of a simple round planar design or utilise more complex geometries (ovals, hexagon etc) to accommodate location within a device or pocket for the primary and secondary coils. The ferrite could be of conventional rigid ceramic or a flexible polymer based ferrite. If a rigid ferrite is used to back the coil, the planar ferrite can be of many profiles such as a bar, channel, angle or complex shapes and profiles. In some circumstances the application of a high permeability material may be used behind the coils for mechanical structure and electro-magnetic shielding.

The ferrite and coil assembly may be encapsulated in either a rigid or flexible protective polymer if used with the primary board as a ruggedized standalone structure that would be placed in a pouch within the pocket. When a pocket insert is used the insert would provide the environmental and mechanical protection required for the primary power and data circuits, coils and antennas.

Inductive Data Transmission using NFC

Power may be transmitted wirelessly using inductive power transfer and data may also be transmitted inductively, providing a soldier system without umbilical, tethers or external wires connecting devices.

For a soldier system, magnetic flux inductive data transmission offers the advantage that it can perform short range data exchange without a wired or physical connection. Inductive coupling has excellent material penetration capabilities. It can penetrate non-magnetic materials such as air, water, body tissue, fabric, soft armour panels, and plastic. As no exposed electrical contacts are required for inductive data transfer or inductive power charging, the primary side of the inductive circuits located on the soldier can be fully encapsulated and environmentally ruggedized. As the secondary side device circuit is contained within the target independent device, the independent device can now be semi-permanently sealed and ruggedized as frequent data cable coupling and battery replacement is not required. This enables the inductive power and data transfer enabled devices be full submersed in water, and be impervious to exposure to ice, snow, mud, dust, dirt, sand, etc as well as battlefield petroleum, oils and lubricants (POL's).

Inductive transmit and receive coils separated by an air-gap may be thought of as a weakly-coupled transformer, across which encoded data may be transmitted by modulating the source (or transmitter) and detecting the modulated signal at the receiver. Typical frequencies in the low frequency range for the inductively coupled data transmission are between 100-500 kHz and can be used for low baud data rate of up to 9.6 kbps, and in the high frequency range 13.56 MHz is used when high baud rate data transmission of up to 424 kbps are required. The US Army has identified required data rates of between 9.6 Kbps for physiological status monitors to 256 Kbps for weapon ballistics computation. Baud rates of greater than 80 Kbps second are required if low resolution streaming video is to be supported, with a baud rate of 256 Kbps for full streaming video. It has been determined that high quality audio transmissions can be made with data rates of 30-40 kpbs.

One method of creating an inductive data link is to utilise Near Field Communication or NFC technology which uses an inductive link to enable connectivity between devices. NFC technology is an open architecture technology based on the ECMA 340 and 352 connectivity standards. ECMA 340 specifies a magnetic induction interface operating at 13.56 MHz and with data rates of 106, 212, 424 kbps and if required 848 kbps or higher. The standards describe the encoding and modulation of data to be used when transmitting and receiving NFC data.

Inductive data transfer as with inductive power transfer also employs vicinity inductive coupling within near field or more specifically the radian sphere. The magnetic flux of a typical inductive data circuit with a central operating frequency of 13.56 MHz has a wavelength of 22 m. Inductive coupling for practical data transmission purposes occurs no further than the near field-far field transition or radian sphere which is approximately defined as $\lambda/2\pi$ (lambda/(2×pi)) or for 13.56 MHz a theoretical maximum range of 3.5 m. In practise, because of the very low power levels utilised and because the magnetic field intensity attenuates at a rate following the inverse cube law, a practical low power independent hand-held device has a range limit of about one metre. This is considerably unlike inductive power transfer requirements which to be reasonably efficient the primary and secondary coils must be in close proximity of typically less than 1 cm, with power levels of 1-5 watts for handheld devices. It is understood that the proximity estimates for data transfer (one metre) and for power transfer (1-2 cm) are not intended to limit, as with optimization of antenna design, location, sensitivity of the transmitter/receiver circuits, etc, those distances may upon further development be increased. The short range attributes of inductive or NFC data transmission also makes it very difficult to intercept by someone trying to electronically eavesdrop as is easily the case with on body short range communication using Bluetooth, Zigbee, WiFi or other radio frequency technologies.

A further benefit of inductive communication is that because it applies the principles of a modulating magnetic field, on body devices would still be able to communicate between themselves and to the soldier system when the soldier enters an area or zone that is being subjected to RF jamming, where the RF jamming is being used to provide protection from the detonation of for example roadside IED's (Improvised Explosive Device) or for other tactical reasons.

NFC inductive data transmissions are half duplex as the same center frequency is used for both transmit and receive. To prevent two devices transmitting at the same time, they operate in what is termed a listen before talk protocol. The devices may only transmit if they previously listen to check that no other devices are transmitting. This anti-collision protocol is a conditional function of IC's that conform to ECMA 340, it also allows multiple target devices to communicate with a single initiator. Another standard that NFC IC's must adhere to is the ECMA-386 NFC-SEC-01 Cryptographic Standard which provides for the implementation of both 128 and 196 bit encryption using one of several specified methodologies. Encrypted data transmission is a very common requirement for military devices to ensure secure communication.

Ferrite Application to Enhance NFC Communication

Coil geometry for either the primary or secondary inductive data coil could be a 3D coil so that transmit and receive conditions are optimised for signal reception between the two coils when they not aligned in parallel. This coil geometry is often used in RFID communication. Due to the many locations on the torso that a hand held or data device may be located and the variations in the size and shape of the devices themselves, the transmit and receive antennas for either the primary or secondary inductive data circuits may be planar (2D), 2.5D or a three dimensional (3D) orthogonal antenna. The coils may be constructed from any of the multitude of rigid or conformal antenna technologies available including air backed, ferrite backed, ferrite rod and ferrite core. The ferrite can be of a simple round planar design or utilise more complex 2.5D or 3D geometries such as those based on dogbone, rod, cubic, or ring or spherical forms etc. depending on the shape of the magnetic field desired. The ultimate range of the inductive communications becomes a function of the transmitted power, antenna diameter or configuration and the Q factor of the coupled antennas.

Methods of Modular Pocket Attachment

The modular pocket with integrated inductive power and inductive data communication attaches to a garment, typically a load carriage vest, armor vest, tactical clothing, chemical warfare clothing or other military or civilian clothing with means of attaching a removable pocket. The pocket is attached to the garment using any of the various attachment methods used for detachable or modular pocket purposes including but not limited to basket weave webbing or Pockets Attachment Ladders System (PALS), hook and loop fastener tape with or without snap fasteners, metal or plastic clips such as the ALICE system moulded quick release fasteners and custom plastic mouldings etc.

The modular pocket can hold any of many electronic devices carried by a soldier or civilian. Typical military devices would be Physiological Monitors, Keyboard, GPS, Tactical Radio(s), Flashlight, CW Sensors. PDA/computer, Target Locator, Camera, UAV controller, Rechargeable Battery, Card Reader and other such portable devices. Civilian uses for the modular pocket would be cellular phone, digital music player, smart phone, GPS, communication radios, survey devices, rechargeable batteries, digital displays etc.

The inductive modular pocket may be of any form factor and could be designed to fit the device it is intended to carry or may be of a generic general utility size. It may have an elasticized inner component through which the device is placed and allows the device to be held securely in place against the primary coil. This will be especially of benefit when devices are placed into a powered utility pouch versus a device specific pocket. The pocket can constructed from soft or hard materials such as fabric, moulded foams, hard and soft plastics and other materials. Typically the pocket is made from similar materials to that of the vest it is attached too. The pocket may have a means of closure to hold the contents secure. The closure can be a flap that is fastened with hook and loop fastener, snaps, buckles etc or it may have other means for holding the pocket contents in place such as webbing, elastic strap, quick release buckle etc. The pocket opening and securing flap may be located on any surface of the pocket.

The modular pocket can be constructed in any of the conventional stacking formats with a single conductive connection to the vest that provides power and data to the each of the individual pockets within the array, or each pocket within the array may have its own connection. The pocket stacking configuration can be comprised of a group of two, three, four or more pockets side by side. Other configurations would be a pair of pockets that are stacked instead of side by side, in a 2×2 configuration that is two sets of side by side stacked pockets.

The pocket insert assembly which comprises a protective housing fitted to the pocket and contains the primary inductive circuits for power and data, cable and connector assembly to connect to the main wiring harness or conductive textile backplane is removable from the modular pocket as a complete assembly. This allows the primary circuit assembly to be swapped out and replaced with a new circuit if it is damaged, or it can easily be placed into another pocket of similar design.

The modular pocket/garment conductive connector can connect to the vest wiring harness through a variety of connection means. The connector can be a minimum of two contacts if only the inductive transmission of power is required. In this case the primary and secondary circuit communicate inductively and regulate charging through the onboard micro-processors. The connector can have three or more contacts if power, power control and data control is implemented. If seen to be advantageous, the primary and secondary inductive electronic circuits may be configured to allow the transmission of data signals over power.

The electro mechanical contact between the modular pocket and the garment can be via mechanical snaps, magnetic connections, wire cable, Mylar or other type of flexible conductive material terminated with a connector with spring loaded pin and pad, pin and socket, sliding pads or other means of conductive electrical connection. Connectors may have environmental protection provided by elastomeric seals or other sealing means that allow it being submerged in water, to have exposure to ice, snow, mud, dust, dirt, sand etc as well as petroleum, oils and lubricants (POL's) without its performance being adversely affected. Positive and negative power pairs and data pairs or bundles, etc can be in one connector body or separate connector bodies.

The pockets connector can exit the pocket or pocket stack at any location or orientation and may be bundled together, individual or split in any grouping. The conductive medium that connects the primary pocket circuit to the garment wiring harness may pass through an aperture in the exterior fabric of the garment. The aperture can be of many sizes, geometric shapes and different finishes. A common aperture example would be a button hole with stitched edging. The garment may have one common aperture or multiple apertures that are distributed around the garment and that could be co-located next to pocket attachment locations.

The physical electrical connection between the garment wiring harness, conductive textile backplane or other conductive medium and the primary inductive power and data circuits located within a pocket can connect under the garment (i.e. under the external shell of the garment), at the pass through aperture, at the pocket or at a point between the pocket and the garments wiring harness. The most robust location for the connector would be at an aperture on the garment or inside the garment external carrier layer where additional mechanical and environmental protection is afforded to the connector The connector should be of a low profile, small footprint design regardless of location on the vest. This will ensure it has the least impact on the human factors of the garment and allows the co-location of pockets to the connector.

Garment Pedestal Connector for Passage Through Outer Fabric Layer of Garment

One embodiment of the connector is a design that allows the wiring harness, which may be an electro-textile, stranded wire ribbon cable, Mylar flexible circuit or conventional multi wire round cable, to stay on the inside of the garment behind the outer carrier fabric. The connector is configured such that it passes through the fabric through an opening or aperture in the outer fabric or shell such as a button hole, round or rectangular slit that may or may not be reinforced or sealed in some manner.

The pedestal of the connector which sits within the aperture of the fabric is the insulated mechanical transition of the electrical conductors between the back side of the fabric and the front side. The wiring harness which lays flat against the inner layer of the garment, attaches to the back or inside part of the connector, with either soldered or mechanical attachment such a crimped connection, pin and header or other electrical contact means. The connector's internal conductors then pass vertically or at an angle within the insulated pedestal of the connector and exit on the front side of the fabric. The front or topside configuration of the connector may be of any termination type currently in use for military or civilian applications or be of a special construction. One variant provides for flush mounted contact pads, which allows for simple in-field cleaning of the contact pin area by a soldier. The front or topside housing of the connector is designed with a profile that provides mechanical restraint to its removal, much like the function of a button. Alternately the housing may allow for a metallic snap fastener that provides electro-mechanical connection to the fabric.

A principle advantage that the pedestal connector provides is that it prevents undue stress and strain on the e-textile wiring harness. If the wiring harness were to pass through the fabric without a connector it would be subject to considerable wear and tear and in general get worked on the edges of the fabric as it passed through to where it would otherwise be terminated. The wiring harness is also provided considerable protection from the environment as it is always covered by the outer shell of the garment.

The mating connection is attached to the primary inductive circuit of the insert or module with a short wiring assembly that with the connector is removable from the modular pocket.

On a soldier system garment with a conventional internal or external integrated wiring harness it may prove beneficial for an existing cable with connector to connect directly to the modular pocket.

FIG. 1 presents a block diagram of the three types of electromagnetic coupling modes: inductive, conductive and radiative, used in a soldier system that is equipped with modular pockets providing inductive power transfer and inductive data transfer. Current soldier modernisation programs are requiring a soldier system 7 to carry multiple electronic devices that all are required to be powered. To reduce the weight of batteries that must be carried by the soldier, eliminate cables and to provide overall increased ruggedness the devices can be designed to transfer data inductively and be recharged inductively through the plastic housing of the device without the use of cables or connectors. A typical example of a hand held pocket stowed device 1 is a multifunction GPS that is configured with an inductive coil or antenna and associated circuits 3, that is provided power and data across an air gap using magnetic flux 2 that provides inductive coupling to the inductive coils 3 in the modular pocket 4 that attaches to the soldiers garment such as a tactical vest. The pocket receives power and data through a conductive e-textile backplane 5 or wiring harness 8 that provides connectivity to a soldier system data computer 6, power manager 28 and battery 27. A system radio 9 may also be attached to the system conductively and provides communication using radiative coupling 10 to a remote radio 11.

Figure 2:
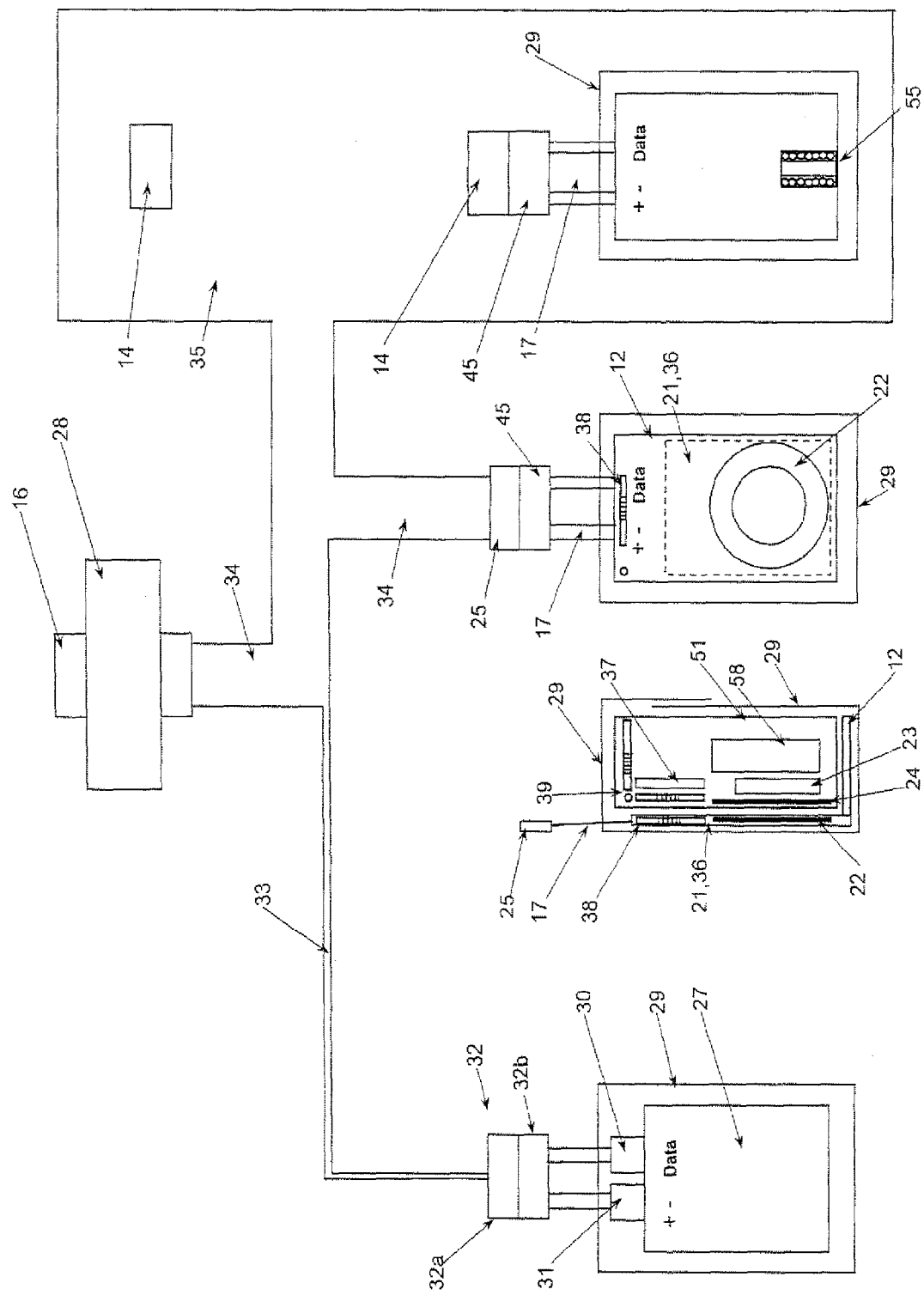

A simplified connection schematic for the inductive modular pocket and associated central power supply and power management system is provided in FIG. 2. DC power 31 from a central smart battery 27 or power source such as a fuel cell stowed within a modular pocket 29 of the soldier system is monitored by a power manager 28 using data 30 transmitted using SMBUS or other similar protocols. The smart battery or energy storage component 29 connects to the soldier system using conductive means such as a conductive connector 32 comprised of a pocket side 32b and soldier system side 32a mating parts. The power and data may be conducted through the soldier system using conventional wire and cables 33 to a power manager module 28 which has further conductive connections 16 to the rest of the soldier system. Conductive connection to modular pockets can be made by wiring harness 33, flat conductive ribbons 34 that may be wired or e-textile or e-textile backplanes 35. A conductive e-textile power and data ribbon connects through a flat e-textile connector 25 on the soldier system harness side to modular pocket connector 45 which provides power and data 17 conductively to a modular pocket inductive power and data insert 12. Alternately power and data could be distributed through an e-textile power and data backplane 35 that has backplane connectors 14 embedded upon it that also allows power and data to be conductively provided 17 to a modular pocket insert connector 45. The insert contains a primary inductive drive circuit 21, and may also have a primary inductive near field communication (NFC) data circuit 36 and primary data antenna 38 depending on the device to be charged and if it requires communication data. The primary power inductive drive circuit 21 is connected to a primary inductive coil assembly that may be planar 22 or low in profile and transfer inductive energy to a planar secondary coil 24 within an electronic device 51 that is placed within the modular pocket 29. Alternately the pocket insert 12 may have a cylindrical primary coil 55 that interfaces with a cylindrical secondary coil within a device. The device contains the secondary inductive coils which may be planar 24 or cylindrical in geometry, and the rectification, voltage regulation and charging circuits 23 appropriate for the energy storage device 58 to be charged which may be for example a rechargeable battery or capacitive storage (collectively also referred to herein as a rechargeable battery). The device may also contain secondary three-dimensional (3D) data antennas 39 and associated drive and receive circuits 37 as required for near field inductive communication.

Figure 3:
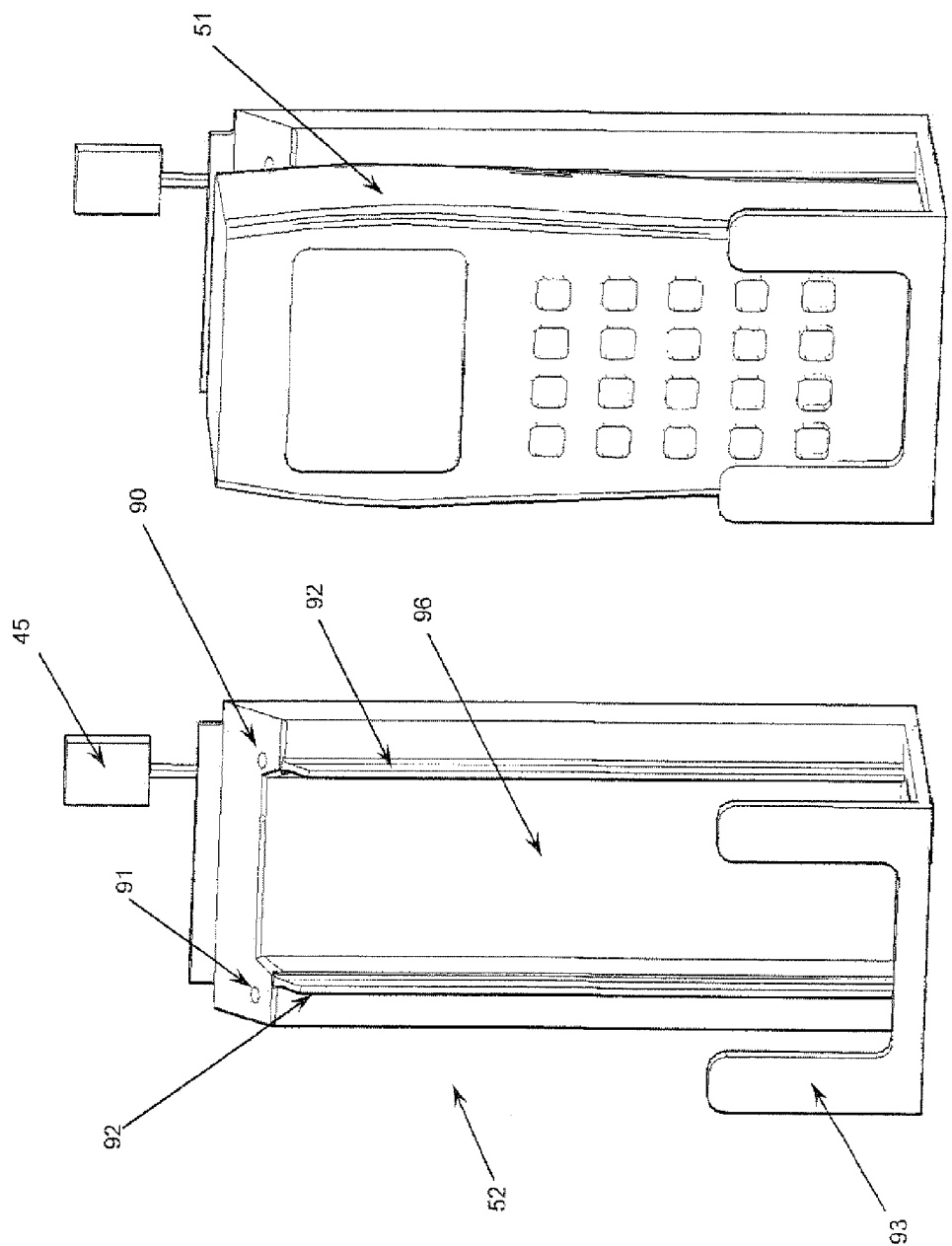

FIG. 3 is a front view of a modular pocket rigid insert 52 that could be molded in plastic and is designed to accommodate a planar coil assembly. The insert which receives power and data via a connector 45 to the soldier system serves multiple functions including an environmental and mechanical housing for the primary power and data inductive circuits and coils, providing precision alignment between the primary and secondary coil assemblies and reduces manufacturing tolerance issues for the typically fabric construction modular pocket. Typical fabric pockets are not manufactured to exacting close-tolerance dimensions. Inserts 52 may merely include a flat surface against which the electronic device is placed. Other designs may be more complex and have guide rails 92 and a recessed back 96 or other alignment features such as depressions, pockets, grooves, channels, protuberance, projections, dovetails or other mechanical aligners to accommodate a complex device profile such as a tactical radio 51. Retention arms 93 may form part of the cradle so as to apply pressure against the device 1 to hold it in intimate and stable contact with the back of the insert ensuring maximum inductive coupling efficiency between the primary and secondary inductive coils due to a minimizing of the proximity or stand-off between the coils. Indicators such as LED's can provide visual checks for power 90 and charge 91 status. A view of a representative pocket insert internal layout 52 for a planar coil is provided in FIG. 4a. The back cover which would be sealed onto the insert to provide environmental and mechanical integrity to the insert has been removed from the drawing for clarity. The connector 45 and cable 17 provide power and data to the primary power 21 and data 36 circuits. The primary circuit board drives the primary inductive planar coil assembly 22 which is precisely positioned to be aligned with the secondary inductive planar coil 24 that is located on the device 51. Typically an insert would be paired or custom designed to function with a specific device so that proper alignment of the primary and secondary coils is ensured. A transmit and receive inductive data antenna assembly 38 and circuit 36 is also shown within the insert. The tactical radio 51, which is one example of many devices 1 that a soldier may carry, is depicted with a removable external storage device such as a Li ion battery 94. The battery contains within its enclosure the secondary planar coil assembly 24; and, rectification, regulation and charging circuitry 23. Indicators 95 such as LED's provide visual indication on the batteries charge status. The battery and all related inductive charging components and circuits can be removed and replaced with a stock battery that has no inductive charging capability without affecting any function of the radio or device. If required inductive communication capability using near field communications (NFC) can be implemented between the radio and the soldier system by equipping the radio with an inductive data drive circuit 37 and 3D antenna array 39.

Figures 4C, 4D:
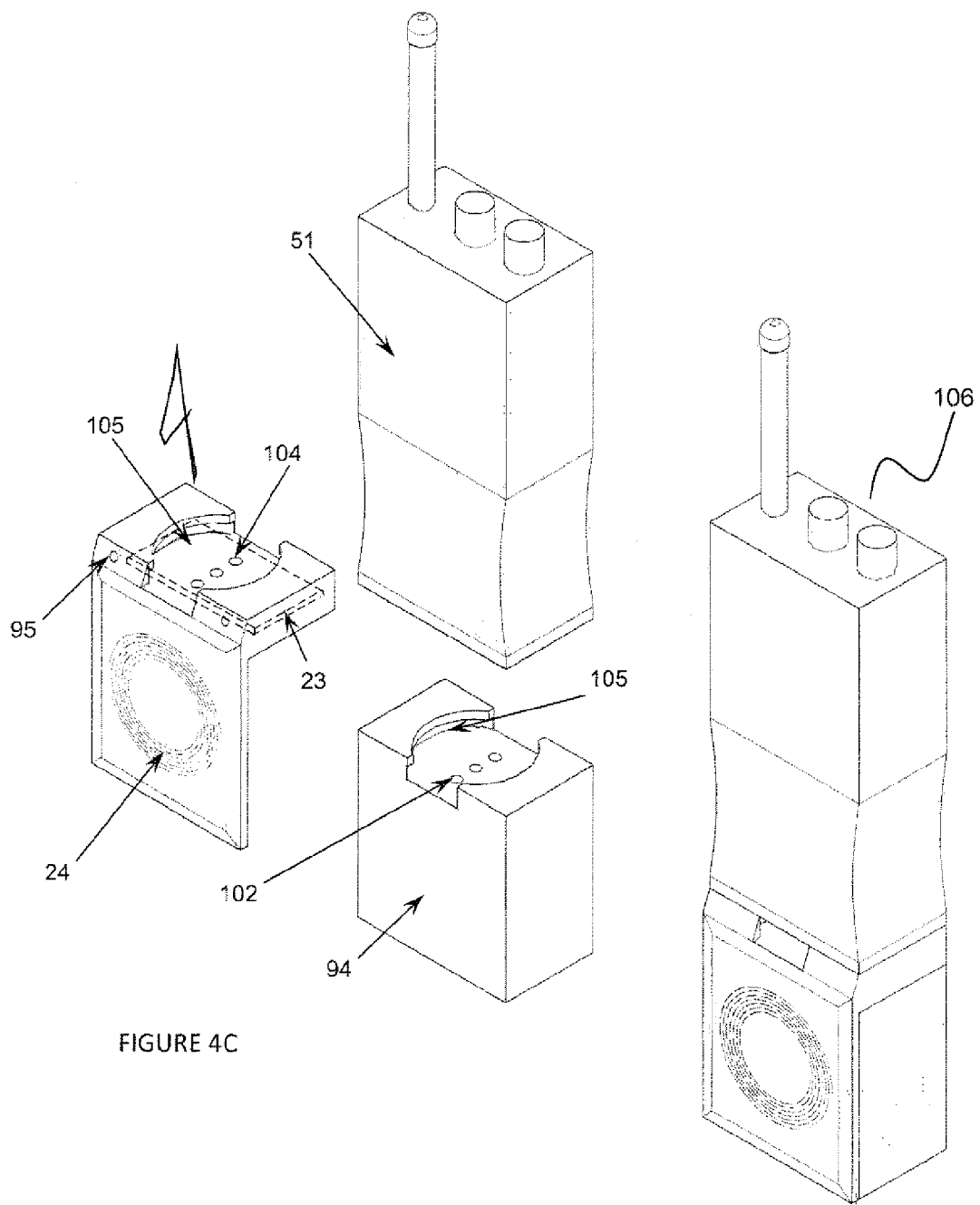
FIGS. 4C and 4D are, respectively partially exploded and assembled views of an alternative embodiment wherein a stock battery is retro fitted with an external inductive battery charging sub assembly.

An alternate configuration is shown in FIGS. 4C and 4D, where a stock removable external battery 94 for a radio 51 or other electronic device, which may be of vertical type battery attached to the back or side of a device or as depicted in FIG. 4D, a battery that attaches to the bottom of a radio, may be retro-fitted with an external secondary inductive charging sub-assembly 103 that allows the radio with stock battery to be placed into a pocket with an inductive charging insert such as described herein and receive charge power inductively. The stock external battery 94 is removable from the radio 51. Battery 94 has external conductive contacts 102 that provide power to radio 51. The external secondary inductive charging sub assembly 103 may be an environmentally sealed unit constructed out of for example plastic. It has integrated within it the secondary inductive power coil 24 and secondary inductive charging circuit board 23. The secondary external inductive charging sub assembly can be semi-permanently attached to the outside of the stock battery using mechanical attachment methods using for example but not limited to screws and adhesive tapes and becomes an inductive charging interface between the stock battery and the radio, the three components forming a complete radio assembly 106, wherein circuit board 23 may be contained within the interface sandwiched between radio 51 and battery 94, and coil 24 may be contained on or within a cantilevered arm, cantilevered from the interface so as to lie flush along an external side surface of battery 94. Contact pins on the underside of the charging sub-assembly (not shown) contact with the electrical contact pads 102 of the battery. In turn a replicate set of battery contact pads 104 on the external charging sub-assembly mate with the contact pins of the radio. If required, LED's 95 can be provided as external charge status indicators. Mechanically, the top side of external inductive charger is configured such that the charger and battery can be attached to the radio in the conventional manner of the stock battery. Within the charger, the inductive charging circuit of circuit board 23 is configured as a Powerpath system allowing the inductive energy provided by the external inductive charging assembly to be used to charge the battery or directly power the radio. In addition, the stock battery 94 and attached external inductive charging sub-assembly 103 can still be placed in a standard desktop charging unit to charge the stock battery. Other iterations of an external inductive charging sub-assembly for different external battery formats and configurations on radios or other electronic devices would also work.

Figure 5:
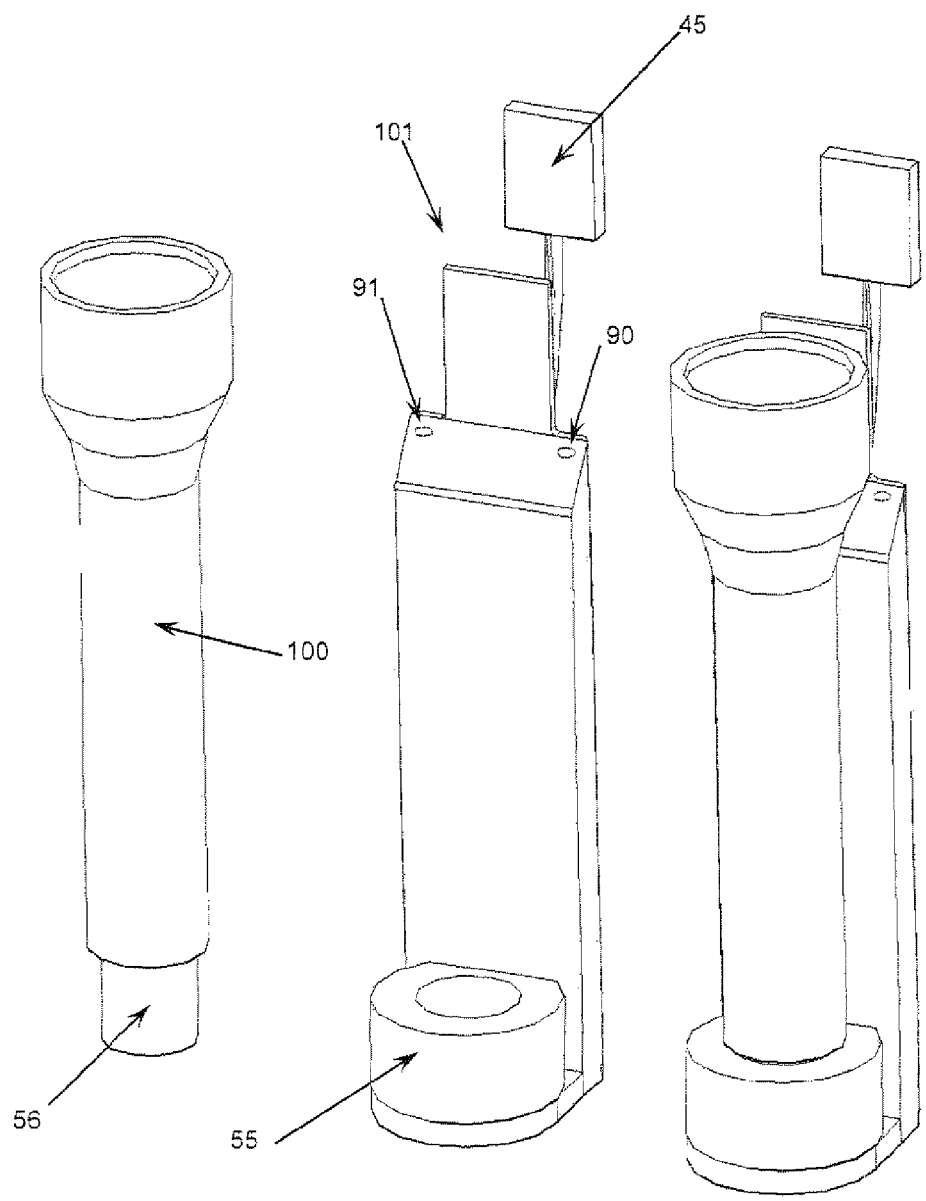
FIG. 5. Representative view of a pocket insert intended for the inductive charging of a cylindrical portable electronic device such as a flashlight.

A representative view of a pocket insert with a low profile connector 45 to the soldier system intended for the inductive charging of cylindrical objects such as a flashlight 100 is provided in FIG. 5. Flashlight 100 is another example of a device 1. The flashlight 100 has a form factor compatible cylindrical secondary inductive coil 56 on its base and is placed into a pocket insert 101 that has a primary cylindrical inductive coil assembly 55 on its base. Indicators such as LED's can provide visual checks for power 90 and charge 91 status. Devices of other shapes and dimensions are easily accommodated with different designs of pocket insert and different geometries and location of primary and secondary coil assemblies.

Figure 6:
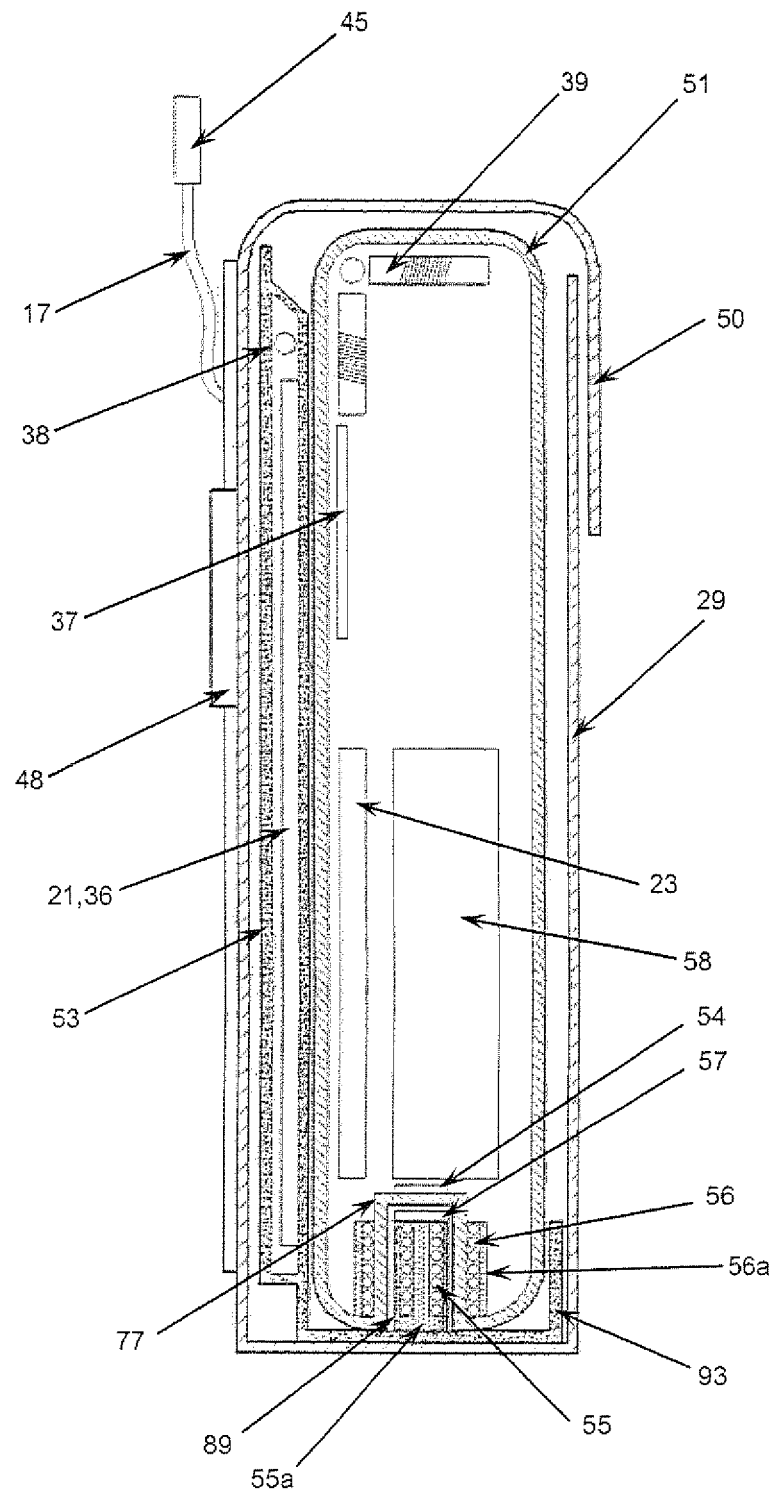
FIG. 6. Cross-section diagram of a modular pocket with cylindrical coils and ferrites in both the primary and secondary inductive charging circuits.
Figure 7:
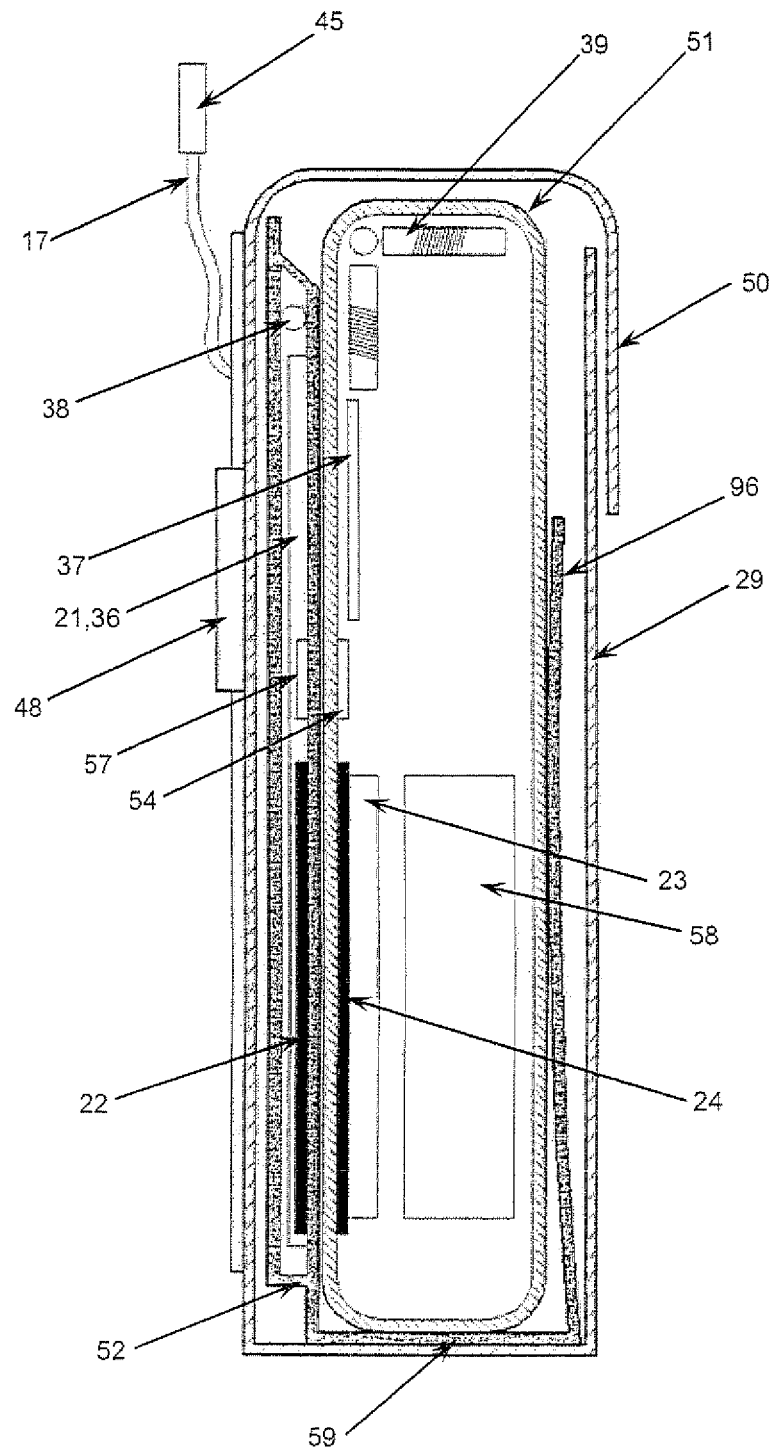
FIG. 7. Cross-section diagram of a modular pocket with low profile planar coils and ferrites in both the primary and secondary inductive charging circuits. The primary circuit is attached to the back of a formed pocket insert which has curved or sprung retention arms at the front.
Figure 8:
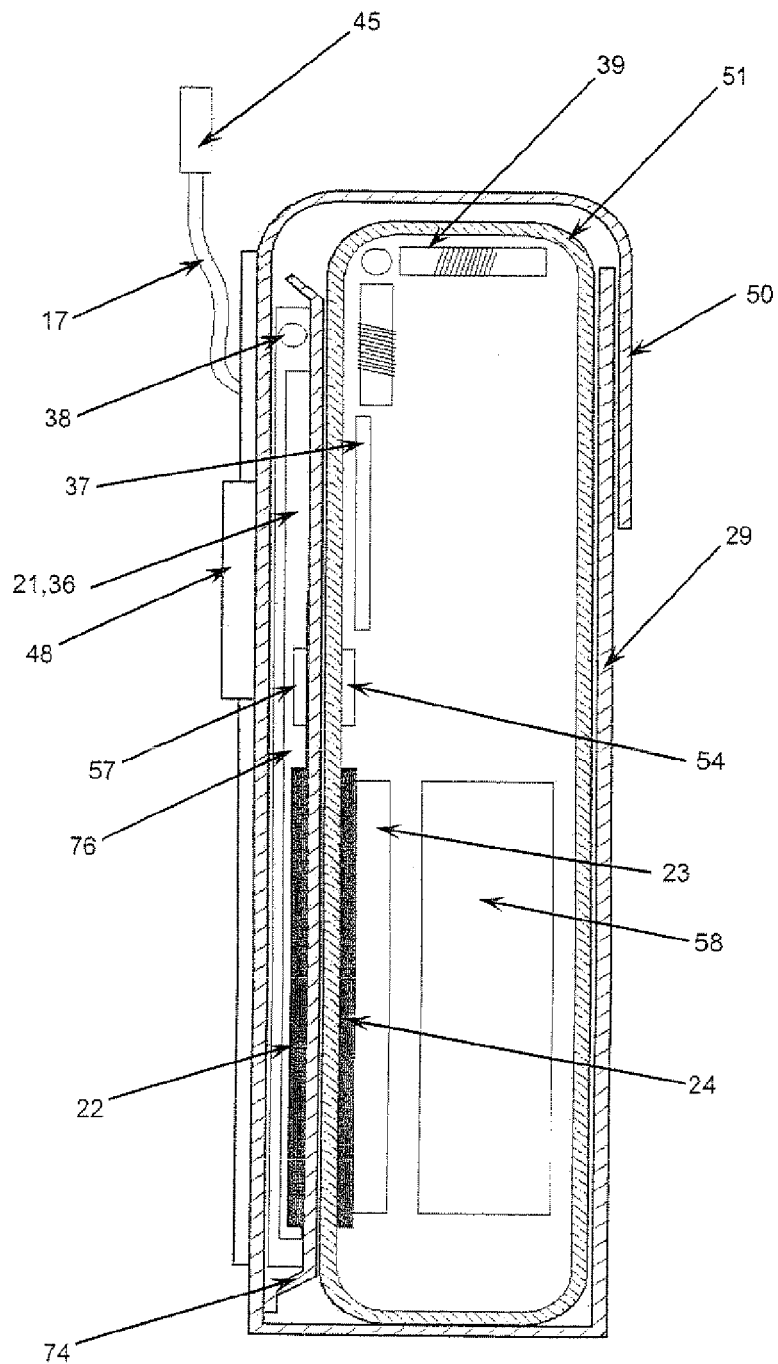
FIG. 8. Cross-section diagram of a modular pocket similar to that shown in FIG. 7, except that the primary inductive drive circuit and planar coil are embedded in a ruggedized encapsulation such as potting epoxy thereby providing one example of environmental sealing of the insert.

FIGS. 6, 7 and 8 provide cross-section diagrams of a modular pocket and pocket inserts with example configuration iterations for the provision of inductive power and data to an electronic device 51. FIG. 6 is a cross-section of a modular pocket 29 and pocket insert 53 with cylindrical coils and ferrites in both the primary and secondary inductive charging circuits. The electronic device 51 is stowed and secured in the pocket by a conventional pocket flap 50 that fastens to the main body of the pouch. The pocket is attached to the soldiers garment with a re-locatable attachment system such as a PALS or MOLLE web strap 48 system known in the art. Power and data are provided from the soldier system through the conductive connector 45 and wire 17 to the insert 53 and then to the primary inductive power circuit 21, and data communication board 36, which in turn power the primary inductive power coil assembly and the primary data antenna 38. In FIG. 6 the inductive power is transmitted between primary cylindrical coil windings 55 that have a ferrite core or bobbin center 55a to a secondary cylindrical coil 56 with a ferrite sheath 56a located within the device. The pocket insert coil housing 89 and the device coil housing 77 of the electronic device are seated to provide environmental protection for the coils. Inductive power and data is able to be transferred through any non-conductive, non-magnetic case material of both the insert and device case and across the air gap between the insert and device using magnetic flux. The air gap is a function of the proximity or standoff between the primary and secondary coils. The encapsulated primary coil 55 is attached to the base of the pocket insert 53 and is inserted into the encapsulated secondary coil 56 of the device 51 when the device is placed into the pocket by conveying the device through the opening into the pocket.

Other configurations of insert 53 and coil design can include a sensing device within the pocket insert that on sensing the device in the cradle turns on the main power to the inductive drive circuit. For example, located above the primary coil, a proximity switch 57 such as a hall effect sensor can be triggered by a magnet 54 placed within the secondary coil assembly of the device. The use of a sensor to switch the main drive power to the primary inductive circuit 21 can be used in conjunction with an inductive polling sub-circuit to ensure that power is not provided to the primary coil unless an appropriate device is located within the pocket. Charging of the power storage component 58 within the device is only commenced when the primary circuit 21 receives inductive signals from the secondary charging circuit 23 that charging is required. The energy storage component charge status data is then fed back to the soldier system power manager via the data connection with the soldier system connector 45 using SMBus or other similar communication protocols.

The 3D data antenna components 39 and associated circuits 37 are arranged such that sufficient inductive coupling is maintained between the device and the insert regardless of the orientation between the two when the device is being held and used by the soldier. Small retention arms 93 assist in guiding the device 51 onto the primary coil 55. The geometry of the primary coil can he cylindrical, elliptical, rectangular etc. with the secondary device coil having a geometry to match.

A modular pocket 29 and pocket insert 52 designed for low profile planar inductive coils and ferrites in both the primary 22 and secondary 24 inductive charging circuits is shown in FIG. 7. The primary circuit is attached to the back of a formed pocket insert 52 which has curved or sprung retention arms 96 at the front. The sprung arms apply pressure to the electronic device 51 holding it in close proximity to the back side of the insert. This keeps the primary and secondary coils in close proximity maximizing inductive power transfer efficiency. The bottom of the insert 59 is sized and shaped to ensure the correct position of the device within the insert to provide precise vertical alignment of the primary and secondary coils, with the side of the pocket or additional insert supports providing lateral alignment of the device and coils. As with the cylindrical coils, the planar coils are encapsulated or protected by the plastic or other non-magnetic, non-conductive housing material of the pocket insert and the electronic device. The proximity sensor 57 and magnet trigger 54 or other sensor format can be co-located within the coils or can be located in another suitable location as shown in FIG. 7.

In FIG. 8 the electronic device 51 is of the same planar coil configuration design as that shown within the electronic device shown in FIG. 7, however an insert is not employed within the modular pocket. Instead the pocket has a small pouch, capsule or sleeve 74 incorporated into the lining, into which a primary power and data inductive driver board 21,36 and corresponding primary coil 22 and antenna 38 can be inserted and still be in the correct position to have a high degree of coupling with the secondary inductive components. The primary inductive drive circuit and inductive power planar coil assembly 22, and the communication data drive and receive circuit and related antennas are embedded in a ruggedized encapsulation or matrix 76 such as potting epoxy. The device shown within the pocket could be used in pocket designs as shown in FIG. 7. In the embodiment of FIG. 8, the manufacturing tolerance for the pockets fabrication is inherently much higher (that is, closer toleranced) in order to provide alignment between the primary and secondary coils.

One advantage of the insert configuration of FIG. 7 is that insertion of the handheld device 51 into pocket 29 may be done with only one hand. This is because the three dimensional support structure or mounting structure of the insert, etcetera in the pocket holds the pocket with its cavity ready to receive the device 51. The soldier, while perhaps holding a weapon in the other hand, may then merely with the soldier's free hand open the pocket flap 50 and convey the device 51 downwardly into mating between arms 96 and the back surface of insert 52, then, using the same hand, close the pocket flap securing the device in the pocket. In the embodiment of FIG. 8, as with many fabric pockets, the pocket easily collapses, closing the cavity in the pocket, so that inserting the device requires re-opening the cavity and sliding the device into the pocket cavity with only one-hand. This may sometimes cause the device to bind in the material of the pocket especially if the pocket is wet, or the pocket fabric of a naturally binding material. The reference to fabric as used herein is intended to include all flexible pocket materials, not necessarily limited to fabrics in the conventional sense, but also to include synthetics, foams, and other webbing or material which is non-magnetic, non-metallic and at least somewhat flexible.

Figure 9:
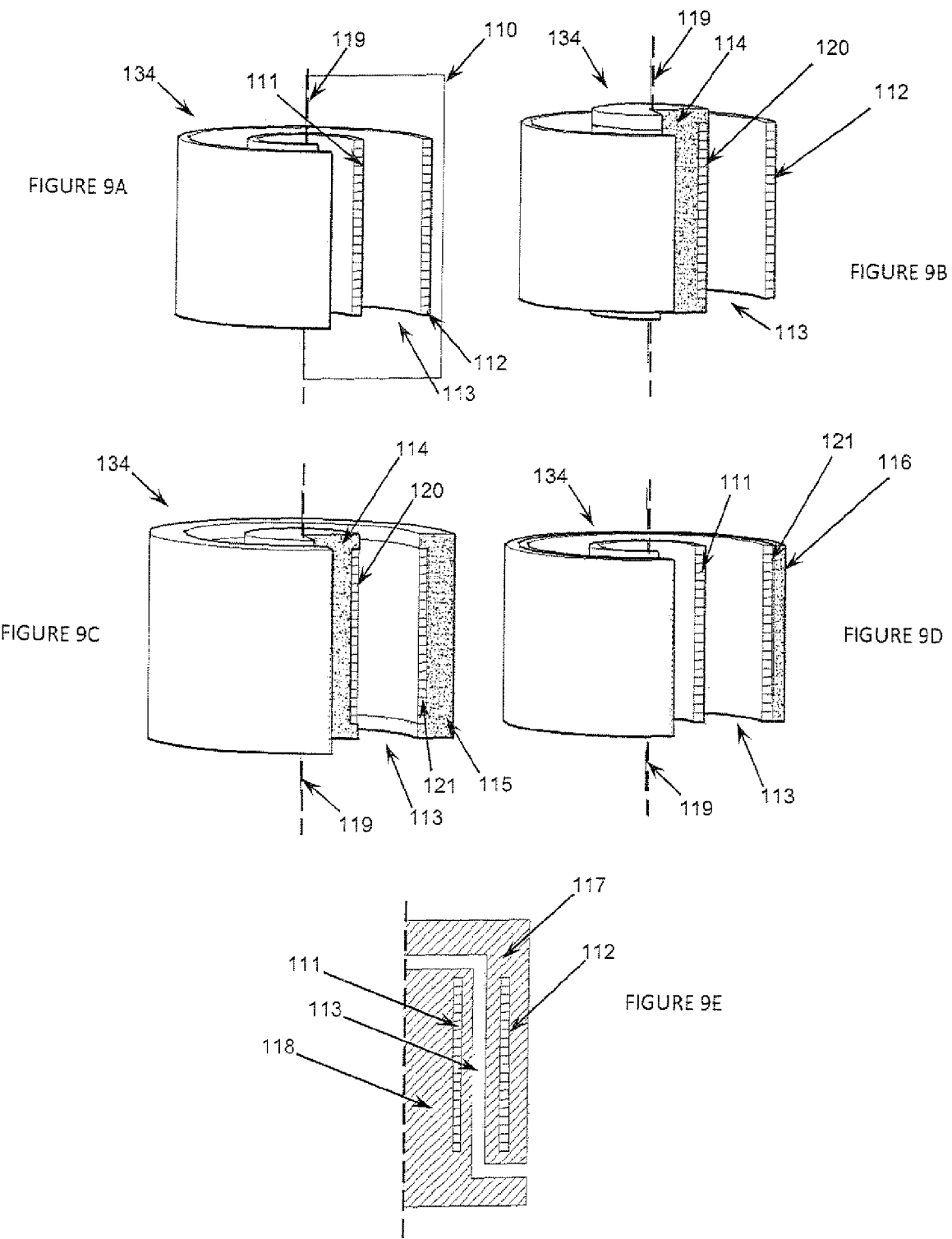
FIG. 9. A series of diagrams to show example primary and secondary inductive cylindrical coil construction.

A series of diagrams to show example primary and secondary inductive coil constructions are provided in FIG. 9-12. FIG. 9 provides examples of various cylindrical coil primary and secondary assemblies 134. In FIG. 9A-D for clarity, the environmental encapsulation of the proximally located coils 111,112 within a device 117 or for the pocket insert 118 has been omitted. A cross-section of each of the revolved coil assemblies with centre axis 119 has been represented by the section plane 110 shown in FIG. 9A. FIG. 9A shows the construction of a simple cylindrical air backed coil assembly with inner 111 and outer 112 coil windings that have an air gap 113 between them. FIG. 9B is same windings with the inner coil 120 having a ferrite core or bobbin 114. FIG. 9C shows an additional ferrite housing 115 on the outer coil 121. In FIG. 9D the ferrite housing on the outer coil 121 has been replaced with a ferrite sheath 116. The sheath 116 only covers the outer diameter of the coils length, while a housing 115 covers the outer diameter as well as wrapping around both ends. Many geometries and combinations of ferrite can be applied to the primary and secondary coils.

FIGS. 10A-10D are illustrations of the magnetic field as applied to the inner coil of the cylindrical coil assemblies shown in FIGS. 9A-D. Each of the diagrams is a half section of a coil assembly with centre axis 119 as produced by the plane section 110 shown in FIG. 9A. The AC energy required to induce the magnetic field 135 can be applied to either the inner 130 or outer coil 131 to obtain inductive power transfer across the air gap 147 that is between coils. If the AC current is applied to the outer coil then the shape and orientation of the magnetic field changes accordingly. In FIG. 10A the inductive coupling co-efficient between the air backed inner 130 and outer coil 131 is very poor at around 48%, as much of the magnetic field emitted by the primary coil 130 is not intercepted by the secondary coil 131. The magnetic flux not intercepted or received by the secondary coil is also referred to as magnetic flux leakage 132. By introducing a ferrite core or bobbin 114 to the primary inner coil 130 shown in FIG. 10B, the magnetic flux 133 has become more directed towards the secondary coil 131, with the coil assembly exhibiting a 64% inductive coupling co-efficient or loosely coupled. The further addition in FIG. 10C of a ferrite sheath 116 on the outside diameter length of the secondary coil 131 further increases the inductive coupling co-efficient across the air gap 147 to 79% or tightly coupled. The magnetic flux leakage 132 has been reduced and the intensity of the magnetic flux as shown by the field lines between the inner primary and outer secondary coils has increased. In FIG. 10D, a high co-efficient inductive coupling of 88% or better can be obtained by the application of both a ferrite bobbin 114 to the inner coil 130 and a ferrite housing 115 to the secondary coil 131, essentially eliminating all magnetic flux leakage between the coils and providing a very strong inductive coupling across the air gap 147 between the coils. The higher the inductive coupling between primary and secondary coils, the more efficient the transfer of energy. One hundred percent energy transfer or inductive coupling is not possible due to the air gap between the coils and eddy current loses within the coils among other factors putting a practical limit on inductive energy transfer may be around 90-92% for small air gaps of less then 3-4 mm, with optimal proximity/stand-off between the coils being less than or substantially equal to 1.5 centimetres, with 1.0 centimetres being better and less than 0.5 centimetres being better yet.

Figure 11:
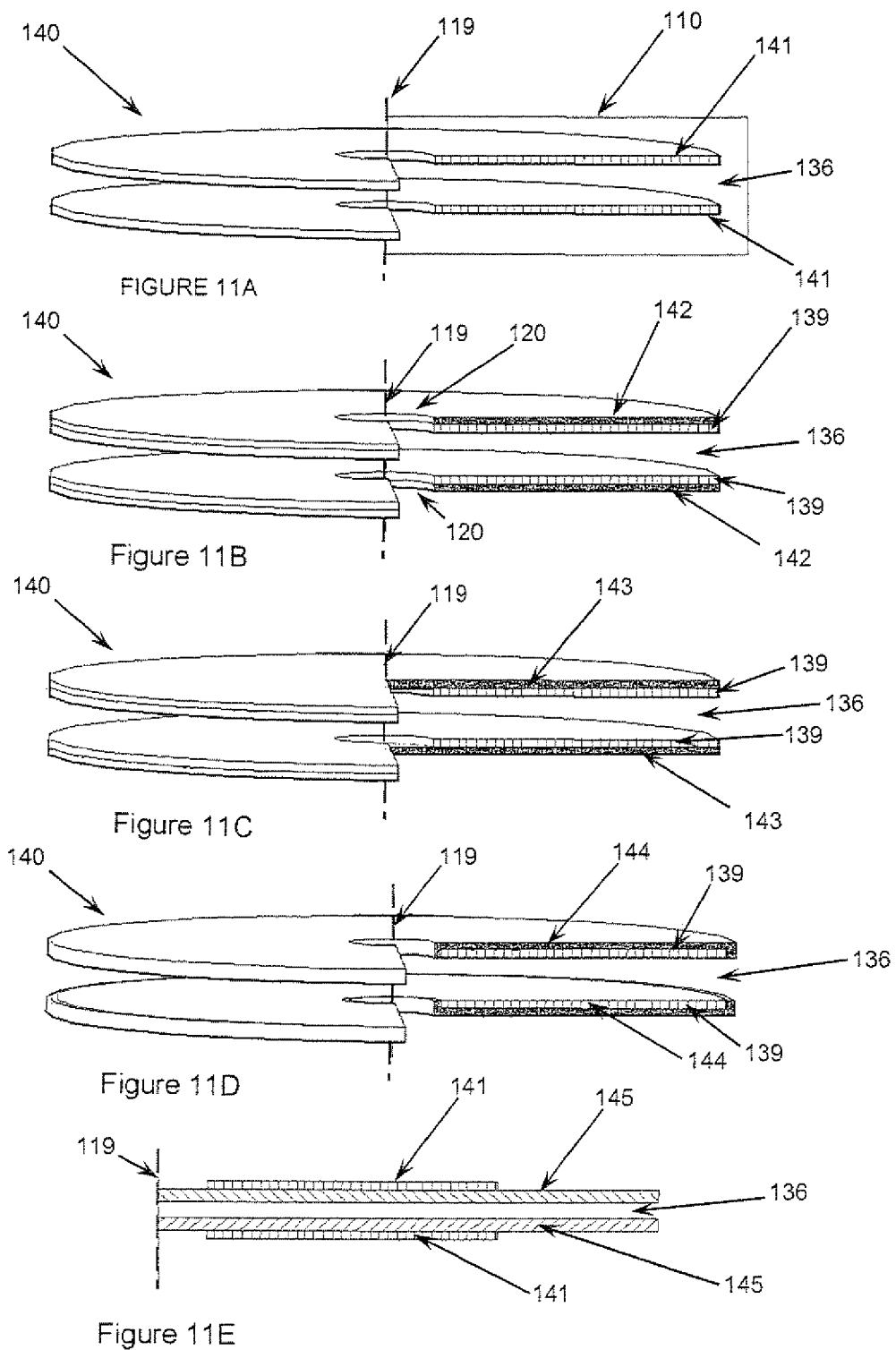
FIG. 11. A series of diagrams to show example primary and secondary inductive planar coil construction.

FIG. 11 provides examples of various planar coil windings and ferrite enhancements. In FIG. 11A-D for clarity, the environmental encapsulation 145 of the proximally located coils 141 provided by the housing a device or of a pocket insert has been omitted. A cross-section of each of the revolved coil assemblies with centre axis 119 has been represented by the section plane 110 shown in FIG. 11A. FIG. 11A shows the construction of a simple planar coil pairing with an upper coil 141 and lower coil 141 that are identical in construction and that are separated by an air gap 136 between them. The simple planar coils have no additional backing or ferrite enhancement and are therefore considered to have both an air core and to be air backed. The coils can be constructed from many materials and configurations including wound magnet wire, would litz wire, PCB etched coils in single or multiple plies, Mylar substrate printed coils etc. FIG. 11B is same windings with both the upper coil 139 and lower coils 139 having a planer disc with an open inner diameter 120. FIG. 11C shows a solid planar ferrite disc 143 as a backing for each of the two planar coils. In FIG. 11D the ferrite backings have been replaced with a planar ferrite housing 144. The housing covers the flat planar surface of the coil as well as the inner and outer diameter edges. Many geometries and combinations of ferrite can be applied to the primary and secondary planar coils.

The magnetic flux created between various planar coil assemblies, when one of the coils is energised is in FIGS. 12A-D. All figures are a cross-section from the revolved planar coil assemblies with centre axis 119 and representing the section plane 110 shown in FIG. 11A. FIG. 12A shows the construction of a simple planar coil pairing with upper and lower 141 coils that are identical in construction and that are separated by a large air gap 147 between them. The coils are mounted on the inside of a non-magnetic, non-conductive protective housing 145 such as the plastic case of a device or the pocket insert. As a result of the large air gap 147, not all of the magnetic field 135 produced by the energized primary coil 148 is contained by the receiving or secondary coil 146. This magnetic field not contained by the secondary coil may also be called magnetic flux leakage 132. For planar coils the strongest magnetic flux 150 is immediately adjacent to the primary coil 148. The coils depicted in FIG. 12a would exhibit an inductively poor coupling co-efficient of approximately 42%. When the coils are brought closer together as shown in FIG. 12B and the air gap 147 is reduced to the minimum determined by the thickness of the plastic housings 145, the secondary coil now intercepts more of the stronger magnetic flux 150 produced by the primary coil, however considerable flux leakage 132 still occurs and the inductive coupling has only increased to 65% which is regarded as being loosely coupled. If a planar ferrite backing 142 is placed on coils with an air gap 147 of several millimetres as shown in FIG. 12C, the coils now become tightly coupled with an inductive coupling co-efficient of 78%. As the air gap 147 is further reduced in FIG. 12D to essentially zero, or when the housings of the coil are in intimate contact as provided by the pocket insert as described herein so as to house an electronic device, then the coils exhibit high coupling with an inductive coupling co-efficient as high as 88%, with essentially no flux leakage exhibited by the energized coil assembly 135.

Figure 13:
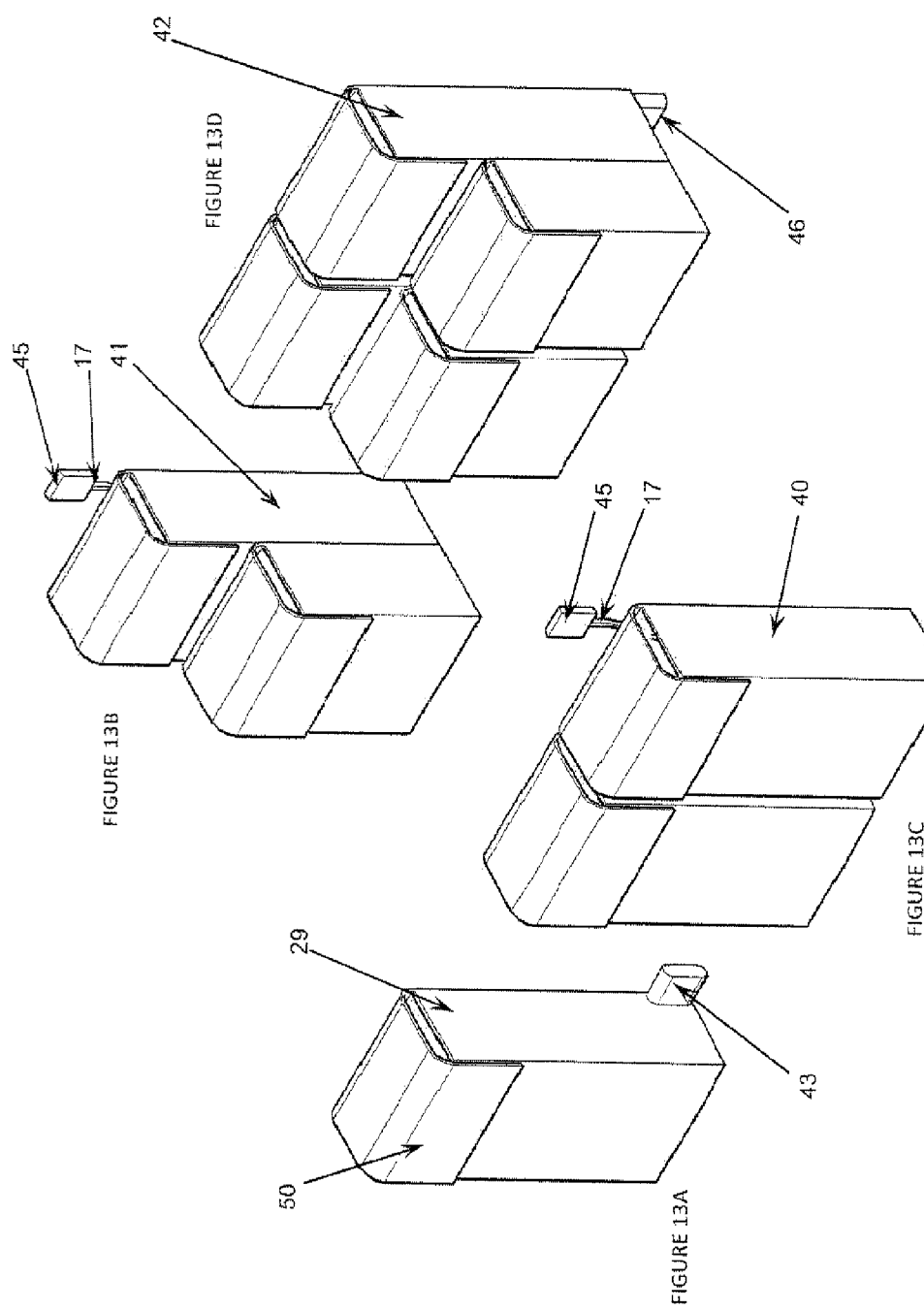
FIG. 13. Illustrations of various modular pocket array configurations.

There are many variants to the design of how modular pockets can be configured either as single pockets or a pocket array that attaches to a carrier garment. The four styles shown in FIG. 13 are representative of the most common variants found in tactical clothing pocket array configurations. All the pocket variants shown require only one connection to the garment, however a connector for each pocket in an array could be used if desired. In FIG. 13A, a single pocket 29 that has a pocket flap 50 that can be secured with buckles, snaps, hook and loop fastener or other alternative means is shown with a garment power and data interface connector 43 without a wire lead exiting the pocket at the lower side. FIG. 13B shows two pockets that are stacked 41 with a single connector 45 terminating the end of the power and data cable 17 exiting the top of the rear pocket. Depending on the function of the pocket, electronic devices could be carried in both pocket or either the front or rear pocket. FIG. 13C shows two modular pockets that have been integrated in a side by side array 40 with a rear connector 45 exiting the rear top of one of the pockets. The array could be comprised of any number of pockets. As previously mentioned the pockets can be of unequal size, and only one of the pockets in the array may be designated to hold an electronic device. FIG. 13D shows a four pocket array that is comprised of two side by side pockets stacked on two larger side by side pockets 42 with a connector 46 exiting the array from the bottom side.

Figure 14:
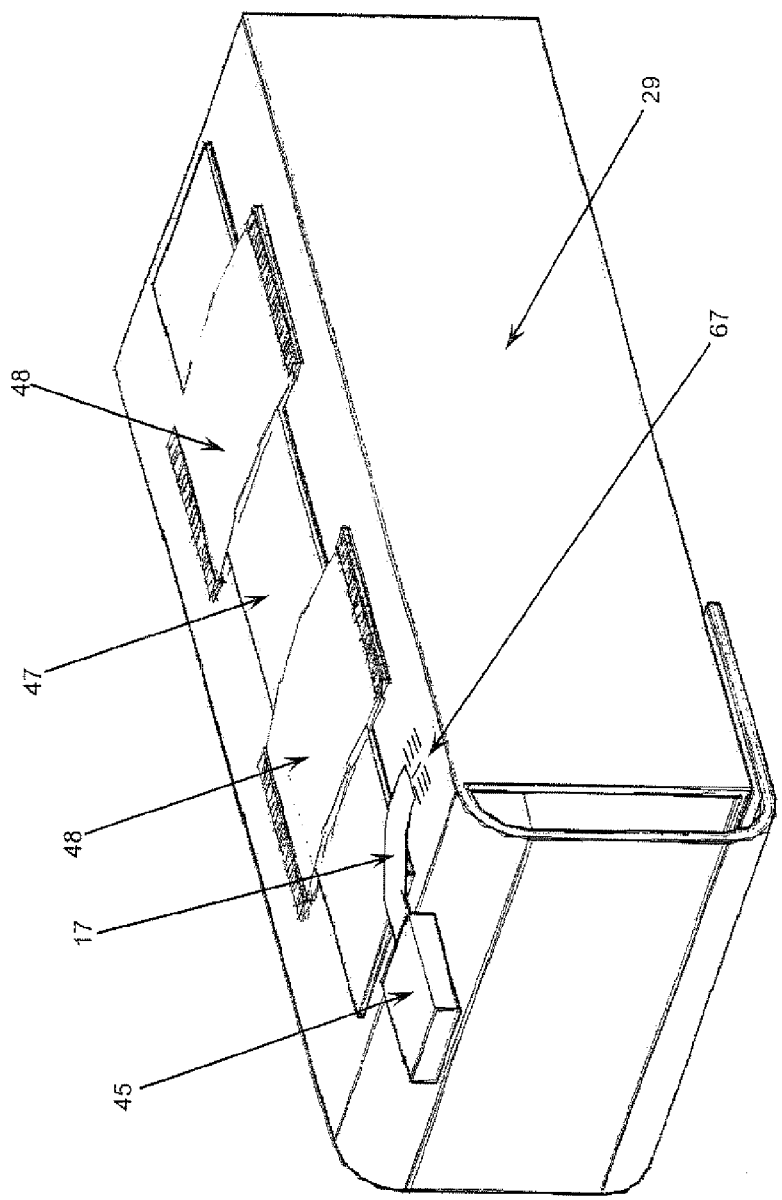
FIG. 14. External view of the rear surface of a modular pocket with a PALS pocket attachment system.

One of the many ways to attach a modular pocket to a carrier garment is the use of a PALS or MOLLE interlocking web strap system. FIG. 14 is an illustration of the rear surface of a modular pocket 29 with a PALS pocket attachment system. The PALS system uses horizontal anchor straps 48 on the pocket that fits into a similar series of mating anchor strips on the vest. A vertical web strap 47 is then interleaved between the pocket and vest anchor straps and in so doing affixing the pocket to the vest. The connector 45 with a wire lead 17 for the inductive pocket insert power and data circuits exits the pocket through an aperture 67 on the upper corner of the back side. Other types of attachment method can be used to attach the pocket to the garment such as snap fasteners and Velcro™ hook-and-loop, buckles etc.

Figure 19:
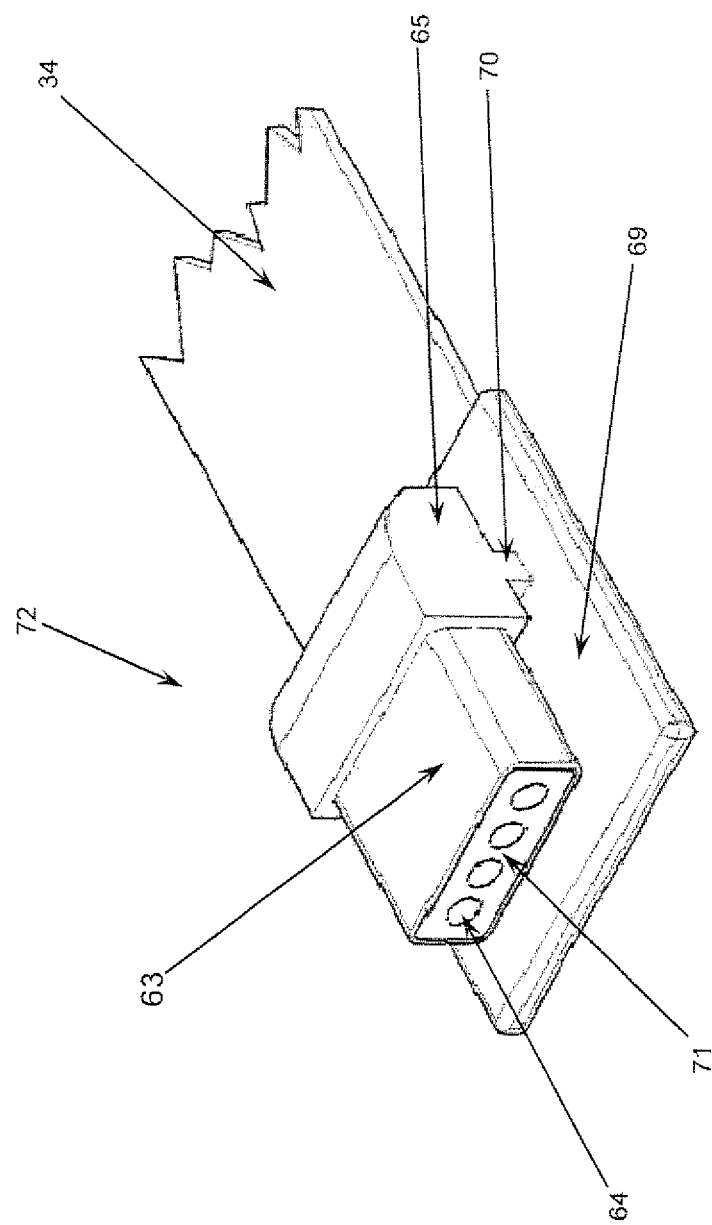
FIG. 19. Perspective view of the pedestal connector shown with a USB type exterior connector shell with contact pads.
Figure 20:
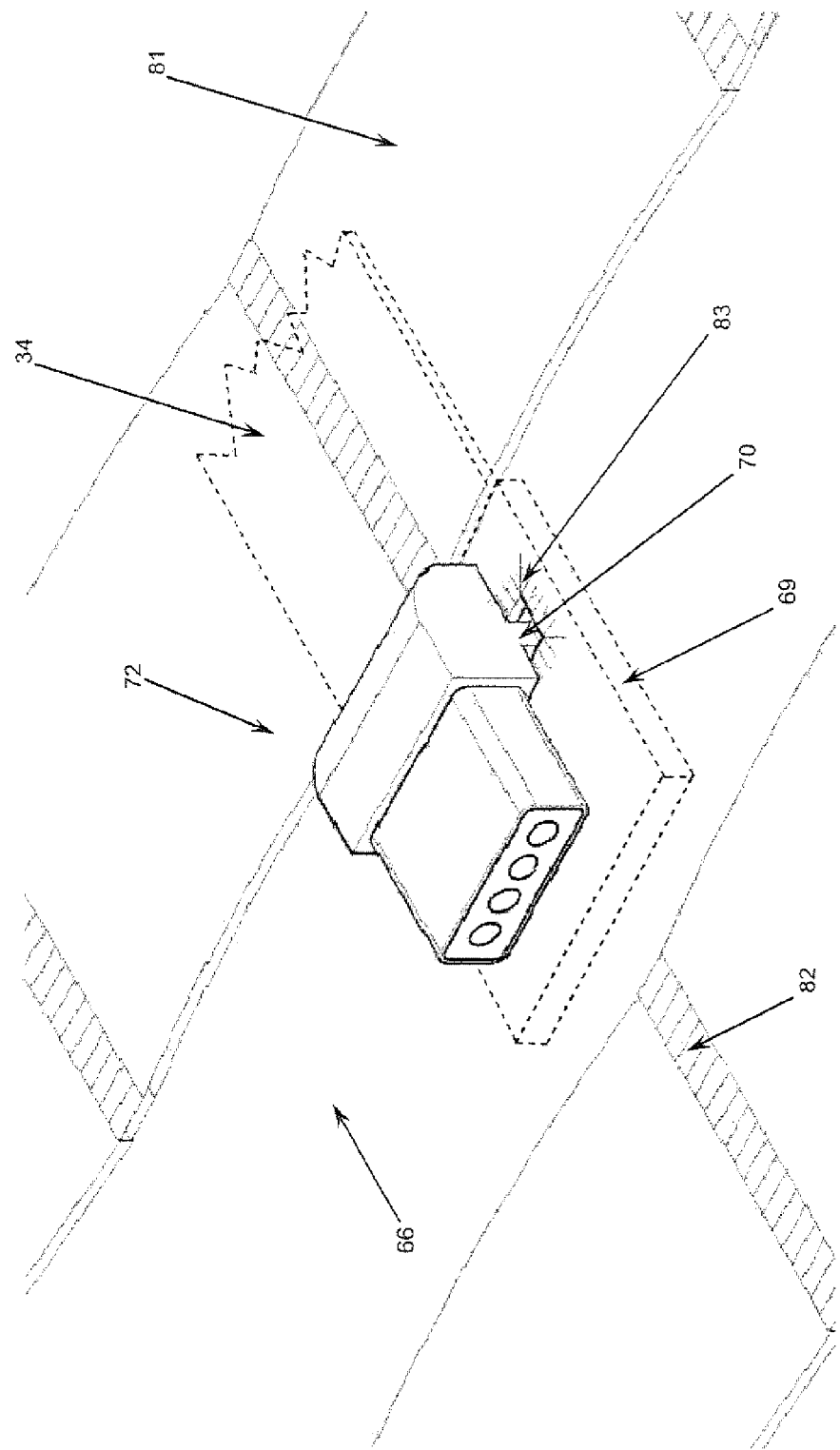
FIG. 20. View of the pedestal connector after installation through the aperture or button hole in the exterior fabric of the garment.

There are multiple ways the power and data connector from the pocket insert 52, 53 or stand alone ruggedized primary inductive board 76 can be connected to the garment central power and data stream. FIG. 15 shows four different ways a modular pocket 29 could be electrically connected to a soldier system. In FIG. 15A the power and data conductor 17 of the pocket insert exits the rear of the pocket through an aperture 67 and terminates with a modular pocket connector 45. The pocket connector 45 connects to the garment wiring harness 33 and connector 25 on the outside of the garments outer carrier fabric 66. FIG. 15B show the same modular pocket configuration as in FIG. 14A but with the pocket connector 45 and conductor 17 now passing through a second aperture 83 in the external fabric layer 66 of the garment. The pocket connector 45 mates with a wiring harness connector 160 that is now under the external fabric layer 66 of the carrier garment. This affords the connector additional protection from both the environmental and mechanical hazards such as snags that could cause a disconnect or cable and connector damage. FIG. 15C illustrates a modular pocket interfacing with a pedestal connector 72 that allows a mating connection between the modular pocket 29 and an e-textile backplane 35 that is located on the backside of the external fabric layer of the garment. The pedestal connector is secured in place by a re-enforced aperture 83, that may be a buttonhole into which it is inserted. The pedestal connector provides power and data connectivity to the e-textile backplane. FIGS. 16, 19 and 20 provide more detail of the pedestal connector design. A pedestal connector could also be used to provide through fabric connectivity to a conventional wiring harness. FIG. 15 is an illustration of the modular pocket connector 45 mated to a lower profile connect e-textile connector 161 on the back side of the external fabric layer, that affords the mated connectors additional environmental and mechanical protection.

FIG. 16 is a cross section diagram that incorporates the principle elements of a fabric transition or pedestal connector showing male and female components. The design of the actual contact housing and contact type connector can take the many forms of existing low profile commercial and military connectors. What is unique to this connector is the insulated vertical transition within which the power and data conductors can pass from the back side of the fabric to the front. The bottom of the connector which is on the inside of the exterior fabric and to which the e-textile or conventional wiring harness connects has a very low profile and with sufficient foot print to provide the connector with stability and to keep it securely it in place within the fabric aperture. On the top side of the exterior fabric the front and rear connector overhang complete the retention system of the connector. The connector can be of plastic, metal, resin or other suitable material construction and is comprised of a male 79 and female pedestal 72 part assemblies that mate together. FIG. 16A shows a basic female shell 61 that contains within it a series of contacts, in this example spring loaded plunger pins 62 that are attached within a protective housing 65 to the power and data connector from the pocket insert 17 and an elastomer seal 80. The connector can be any number of contacts wide by typical one or two connector rows high to keep the mated connector as low profile as possible. FIG. 16B shows the main components of the pedestal connector 72, which is secured in place by inserting it into an aperture 83 such as a button hole that is manufactured into the external fabric layer 66 of the garment. The pedestal connector 72 has contact pads 64 within insulation 71 and outer shell 63 that mate with the pins 62 when the male and female connector parts are mated as shown in FIG. 16C to provide a conductive path for transmission of power and data. The contact pads 64 are internally connected through the insulation and mechanical housing 65 of the connector, with the conductors 68 making a 90 degree turn and passing through an insulated vertical transition 70 that provides the conductive path for power and data from the vest to transit from the back side of the external fabric layer to the front while also providing a simple locking mechanism to hold the pedestal connector in place. The vertical conductors connect to a base or pad 69, that provides an electrically insulated and environmentally protected means to connect the e-textile pigtail 34 or backplane front side connector and a stable base to enable ease of connection on the front side of the carrier fabric.

A representative exterior fabric garment tactical accessory panel 84 with a PALS ladder webbing system anchor straps 81 for modular pocket attachment is sewn onto the cover fabric 66 with high strength bar tacks 82, is shown in FIG. 17A. The tactical panel can be used over an existing vest as a means of quickly incorporating electronic devices requiring a power and data interface. The panel would be attached to the vest using web straps 85, buckles, snaps or other similar attachment methods. FIG. 17B show the front carrier 86 of a ballistic tactical vest that is attached to similar shaped rear panel (not shown) with hook and loop fasteners 87. A hard armour ballistic plate can be inserted into a front pouch via the pocket flap 88. The apertures or button holes 83 located on both the tactical panel and vest panel can be used to either secure the pedestal connector or be used for the pocket insert power and data wire to transition through to the back side of the outer fabric layer.

Figure 18:
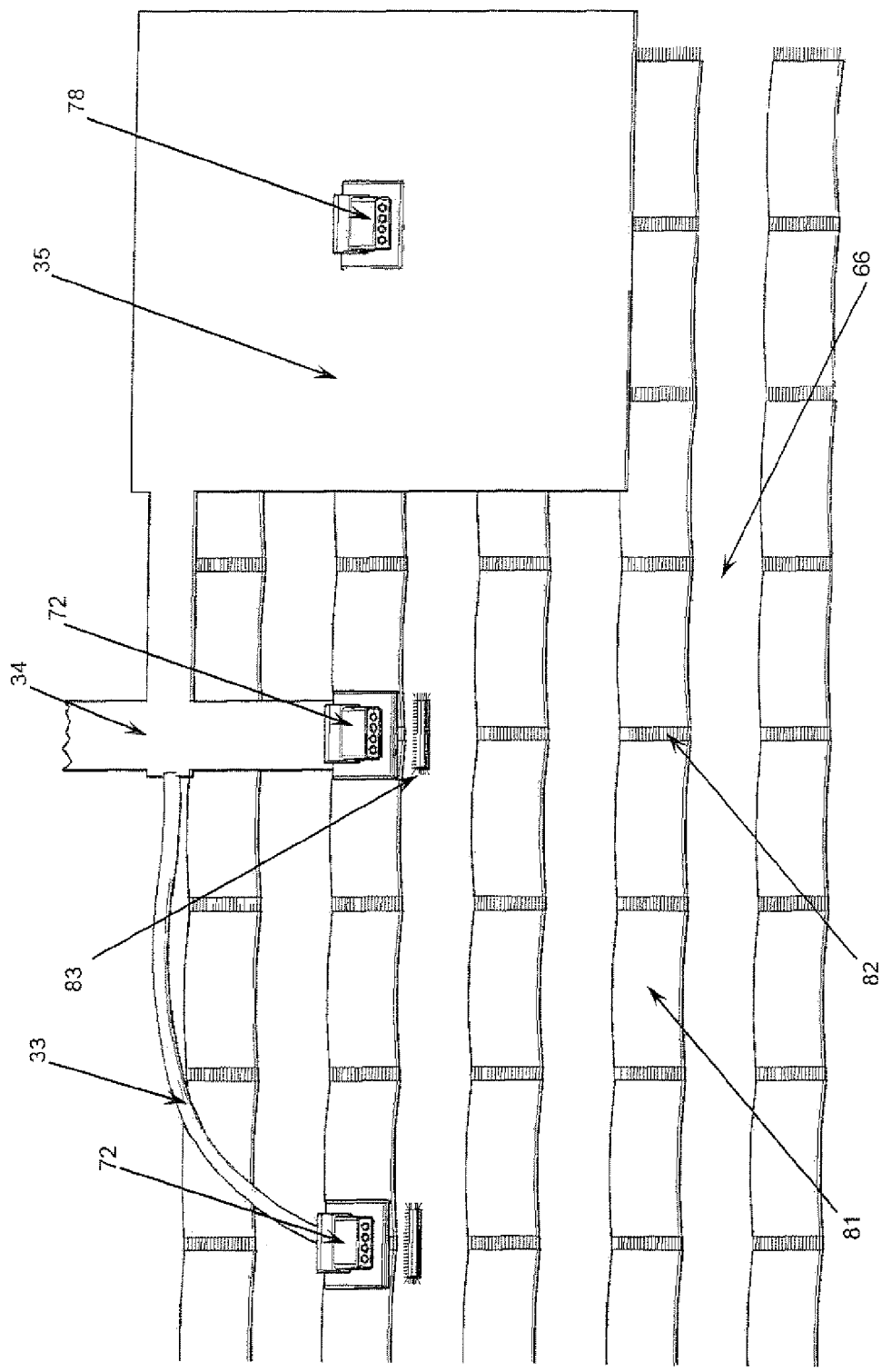
FIG. 18. View of three pedestal or transition connectors attached to a common e-textile power and data harness. The connectors and harness are laid on top of a PALS pocket system. The connector are installed from the under side of the fabric and inserted through the aperture in the outer fabric layer.

A view of three pedestal or transition connectors 72 attached to a composite power and data harness comprised of a insulated wire 33, flat e-textile ribbon 34 and an e-textile backplane 35 with backplane pedestal connector 78 is shown in FIG. 18 prior to the connectors being installed in the fabric apertures 83. In the figure, the connectors and harness are laid on top of garment carrier fabric 66 that has rows of PALS pocket anchor webbing 81 attached to it with multiple bar tacks 82. The connectors are installed from the underside of the fabric and inserted through the aperture 83 of the outer fabric layer 66.

FIG. 19 is a perspective view of the pedestal connector 72 shown with a USB style exterior connector shell 63 with contact pads 64 embedded within insulation 71. The rear housing 65 could be either plastic, resin, metal or other suitable material. A low profile e-textile harness 34 is shown attached to the base 69 of the connector. The pedestal transition feature 70 of the connector is required to transition power and data from the backside of the outer fabric layer to the front side.

A view of the pedestal connector 72 after installation through the aperture or button hole 83 in the exterior fabric of the garment 66 is shown in FIG. 20. The pedestal or vertical transition 70 locks the connector in place.

Figure 21:
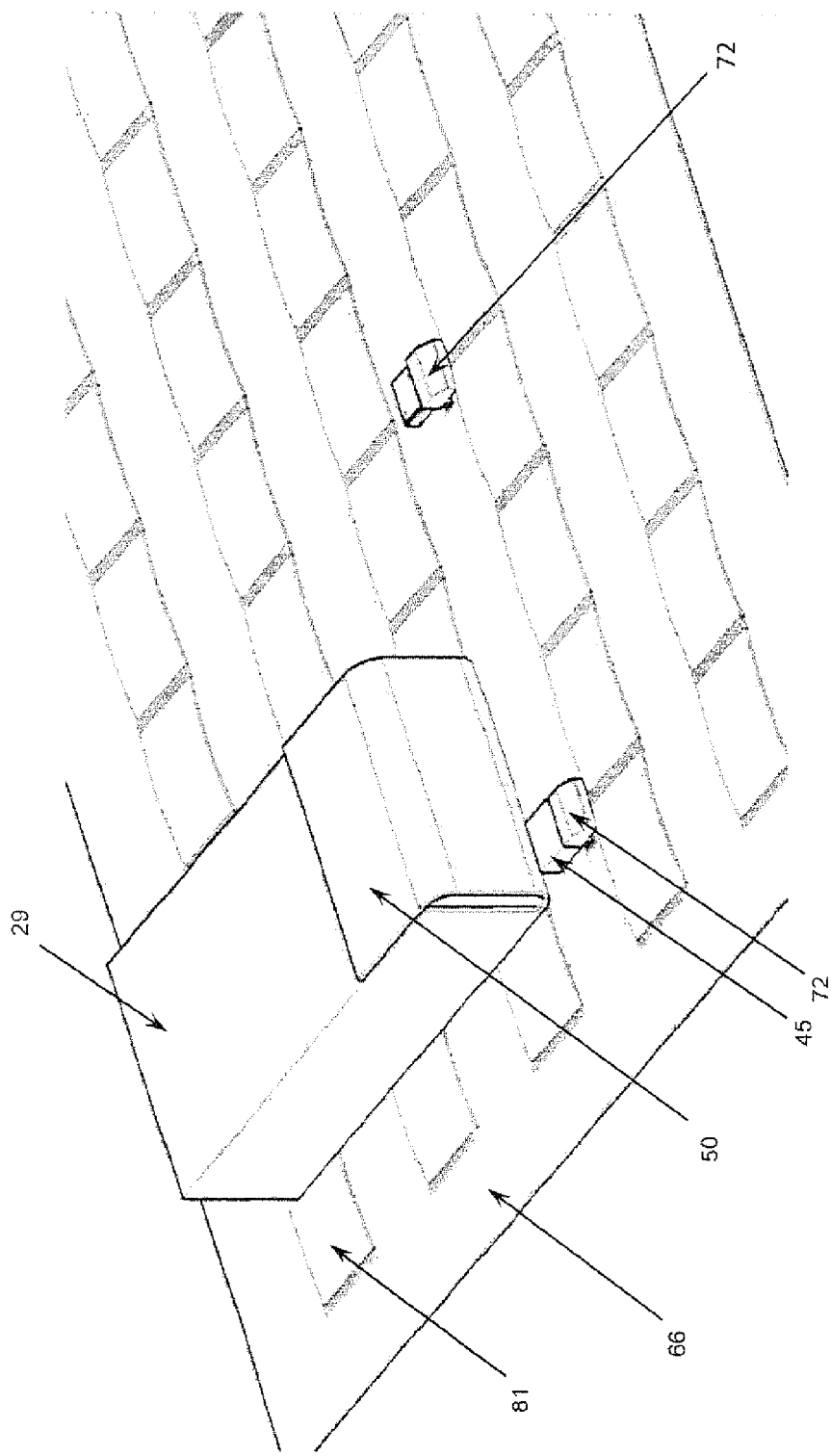
FIG. 21. View of a modular inductive charging pocket attached to the exterior of a garment using the PALS attachment system. The connector from the primary inductive circuit is attached to the mating connector on the garment which provides power from a central battery and allows power management data communication.

FIG. 21 is a view of a modular inductive charging pocket 29 attached to the exterior of a garment 66 using the PALS attachment system 81. The connector from the primary inductive circuit 45 is attached to the mating pedestal connector 72 on the garment 66 which provides power from a central battery and allows power management data communication to the soldier system. An electronic device equipped with a secondary inductive charging circuit including coil and a rechargeable battery can be placed inside the pocket after opening the pocket flap 50, receive inductive recharging power and inductive data communications. An unconnected garment connector 72 is to the right of the pocket. Such garment connectors 72 may be distributed in arrays or otherwise advantageously positioned about a soldiers garment to allow the modular re-arranging of pockets to contain a soldier's electronic devices where most handy and convenient for use and one or more central batteries, fuel cells, etc.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A modular pocket system comprising:
a modularly mountable pocket modularly mountable to a tactical garment,
an insert to align and closely inductively couple a primary inductive coil and related primary drive circuits to a secondary inductive coil and related secondary charging circuits for the inductively coupled transmission of power between the coils so to transmit power to an electrically powered pocket-stowed portable device having a rechargeable energy storage component electrically connected to the secondary inductive coil and secondary charging circuits associated with the device, said insert for mounting in said pocket on the tactical garment, wherein said pocket includes an opening into said pocket and the garment includes electrical conductors for electrical connection between said pocket and a central power supply and a power management system and a soldier system data computer and processor located remote from said pocket,
wherein said insert is substantially rigid non-magnetic, and non-electrically conductive and is adapted for mounting into said pocket so as to be stable within said pocket and stable relative to the garment to accommodate electrical connection between said insert and the electrical conductor of the garment, said insert including an electrical connector adapted for said electrical connection,
and wherein said insert includes a primary power inductive coil and a primary power drive circuit, and wherein said insert includes surfaces which are shaped to support the portable device in said pocket and when so supported said surfaces precisely align said primary power inductive coil in said insert with the secondary inductive coil associated with the portable device, and hold the device stable within said insert,
and wherein said surfaces define an entry way which, when said insert is said mounted in said pocket, is aligned with the opening into said pocket, whereby a user conveying the portable device into said pocket will mate the portable device into said insert and thereby bring said primary coil into closely inductively coupled proximity and alignment with the secondary coil, whereby single handed operation by a user is enabled.

2. The modular pocket system of claim 1 wherein said surfaces define a cradle.

3. The modular pocket system of claim 1 wherein said surfaces include a mechanical aligner cooperating with the portable device to stably and releasably hold said primary power inductive coil and the secondary inductive coil in said alignment at a fixed closely-coupled standoff proximity, wherein said stand-off proximity optimizes efficiency of said inductive coupling of said primary power inductive coil with the secondary inductive coil when the portable device is mounted in said aligner.

4. The modular pocket system of claim 3 wherein said primary power inductive coil and the secondary inductive coil within the portable device each further comprise ferrite chosen from the group comprising: backing, core, housing, sheath, for further optimizing said efficiency of said inductive coupling, and wherein said primary power inductive coil and a corresponding said ferrite form a primary power inductive coil assembly, and wherein the secondary power inductive coil and a corresponding ferrite form a secondary power inductive coil assembly.

5. The modular pocket system of claim 4 wherein said primary power drive circuit and said primary power inductive coil assembly are contained within said insert, and wherein said insert is sealed so as to protect said power drive circuit and said primary power inductive coil from environment external to said insert.

6. The modular pocket system of claim 3 wherein said stand-off proximity is in the range of 0 to substantially 1.5 centimeters.

7. The modular pocket system of claim 6 wherein said stand-off proximity is in the range of 0 to substantially 1.0 centimeters.

8. The modular pocket system of claim 7 wherein said stand-off proximity is in the range of 0 to substantially 0.5 centimeters.

9. The modular pocket system of claim 1 wherein said primary power inductive coil and said power drive circuit is further adapted to receive power data transmissions via said inductive coupling from the secondary inductive coil and a corresponding secondary circuit for determining the power level status of the energy storage component when the portable device is mounted in said insert.

10. The modular pocket system of claim 9 further comprising said electrical conductors, and wherein said modular pocket is a plurality of modular pockets adapted for releasable modular mounting at locations chosen from a plurality of mounting locations on the tactical garment, and wherein said electrical conductors are distributed amongst all of said plurality of mounting locations to provide an electrical network.

11. The modular pocket system of claim 10 wherein at least one of said plurality of modular pockets is adapted to hold said central power supply therein in said electrical connection to said electrical conductors.

12. The modular pocket system of claim 11 further comprising a pedestal connector at each mounting location of said plurality of mounting locations, adapted to pass through corresponding apertures in the tactical garment when said electrical conductors are mounted within the tactical garment whereby said pedestal connectors establish said electrical connections with all of said plurality of modular pockets and said corresponding inserts.

13. The system of claim 12 wherein said processor determines said power level status of the device and monitors a central power level status of said central power supply.

14. The system of claim 13 wherein said processor is adapted to assign priority amongst said plurality of modular pockets.

15. The system of claim 14 further comprising sensors cooperating with said plurality of modular pockets, said sensors communicating with said processor, said processor determining a presence of the devices in said plurality of modular pockets.

16. The system of claim 15 wherein said processor determines which sensed device in said plurality of modular pockets is to be charged from said central power supply.

17. The system of claim 16 wherein said determining by said processor of which sensed device is to be charged is prioritized according to factors including said central power level status of said central power supply.

18. The modular pocket system of claim 1 further comprising a primary inductive near field communication data circuit, and a primary inductive communication data antenna, wherein said communication data circuit cooperates with said primary communication inductive communication data antenna for the inductively coupled transfer of data between said primary communication data antenna and a secondary communication data antenna and associated communication circuits in the portable device, and wherein said primary and secondary inductive communication data coils have a separation distance therebetween in a range of zero to substantially one meter, whereby data from the group comprising voice, text, still-image, streaming video is communicated by said inductive coupling.

19. The modular pocket system of claim 1 further comprising said electrical conductors, and wherein said modular pocket is a plurality of modular pockets adapted for releasable modular mounting at locations chosen from a plurality of mounting locations on the tactical garment, and wherein said electrical conductors are distributed amongst all of said plurality of mounting locations to provide an electrical network.

20. The modular pocket system of claim 19 wherein at least one of said plurality of modular pockets is adapted to hold said central power supply therein in said electrical connection to said electrical conductors.

21. The modular pocket system of claim 19 further comprising a pedestal connector at each mounting location of said plurality of mounting locations, adapted to pass through corresponding apertures in the tactical garment when said electrical conductors are mounted within the tactical garment whereby said pedestal connectors establish said electrical connections with all of said plurality of modular pockets and said corresponding inserts.

22. The system of claim 1 wherein said secondary inductive coil and said secondary charging circuits are mounted in a secondary inductive charging sub-assembly, and wherein said secondary inductive charging sub-assembly is a discreet component adapted for retrofit to, so as to cooperate with, said rechargeable energy storage component and said device, and wherein with said discreet component said retrofit to said energy storage component, the device is said mated into said insert.

23. The system of claim 22 wherein said discreet component is said retrofit between said energy storage component and an interface of said device interfacing with said energy storage component.

24. The system of claim 23 wherein said discreet component forms a second interface between said interface of said device and said energy storage component.

* * * * *